March 18, 1958 D. F. MAPLE 2,827,179
ARTICLE STACKING MACHINE
Filed March 5, 1956 12 Sheets-Sheet 1
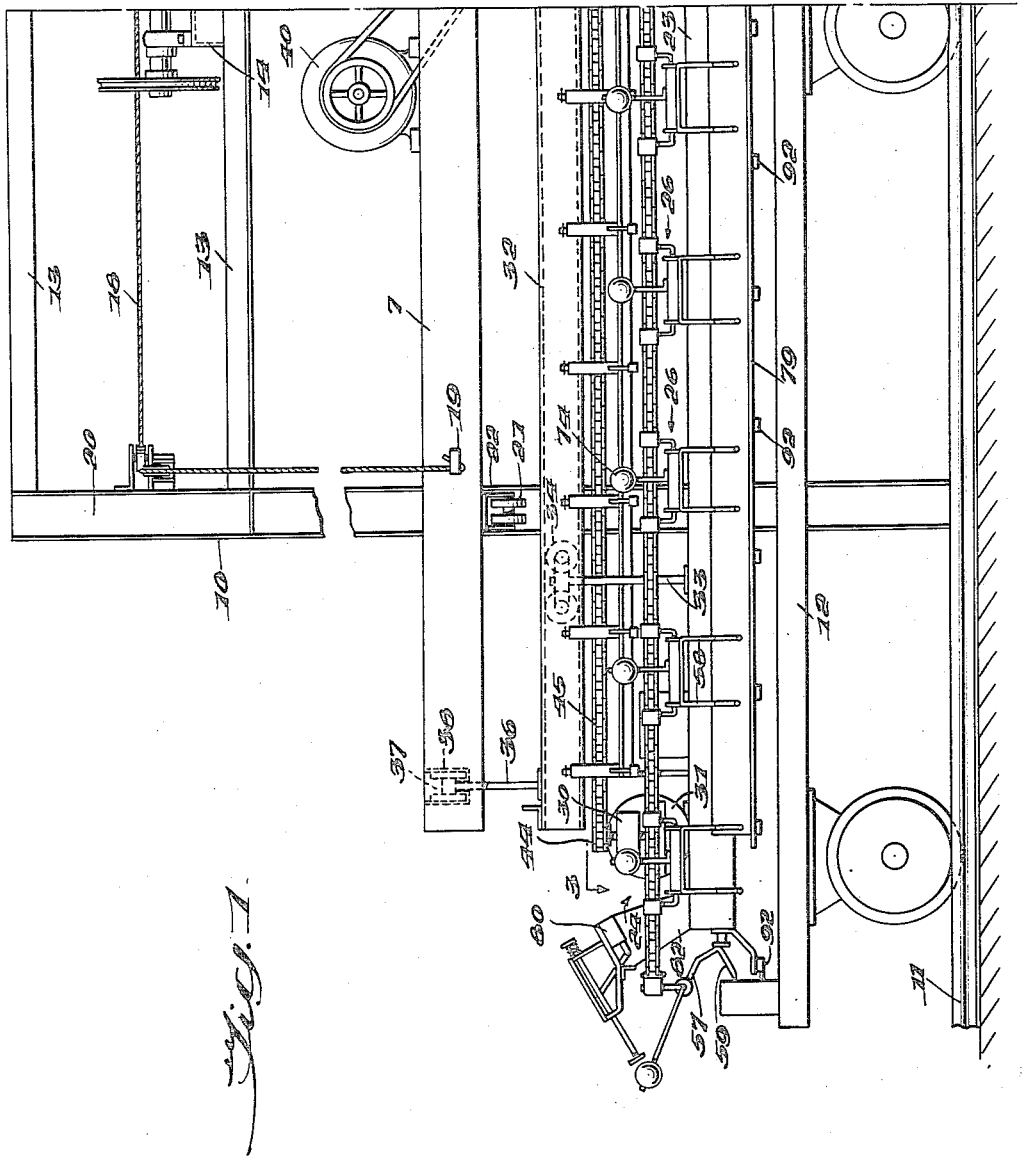
INVENTOR.
DONALD F. MAPLE,
BY
Stone, Boyden & Mack,
ATTORNEYS.

March 18, 1958  D. F. MAPLE  2,827,179
ARTICLE STACKING MACHINE
Filed March 5, 1956  12 Sheets-Sheet 2

INVENTOR.
DONALD F. MAPLE,
BY
Stone, Boyden & Mack,
ATTORNEYS.

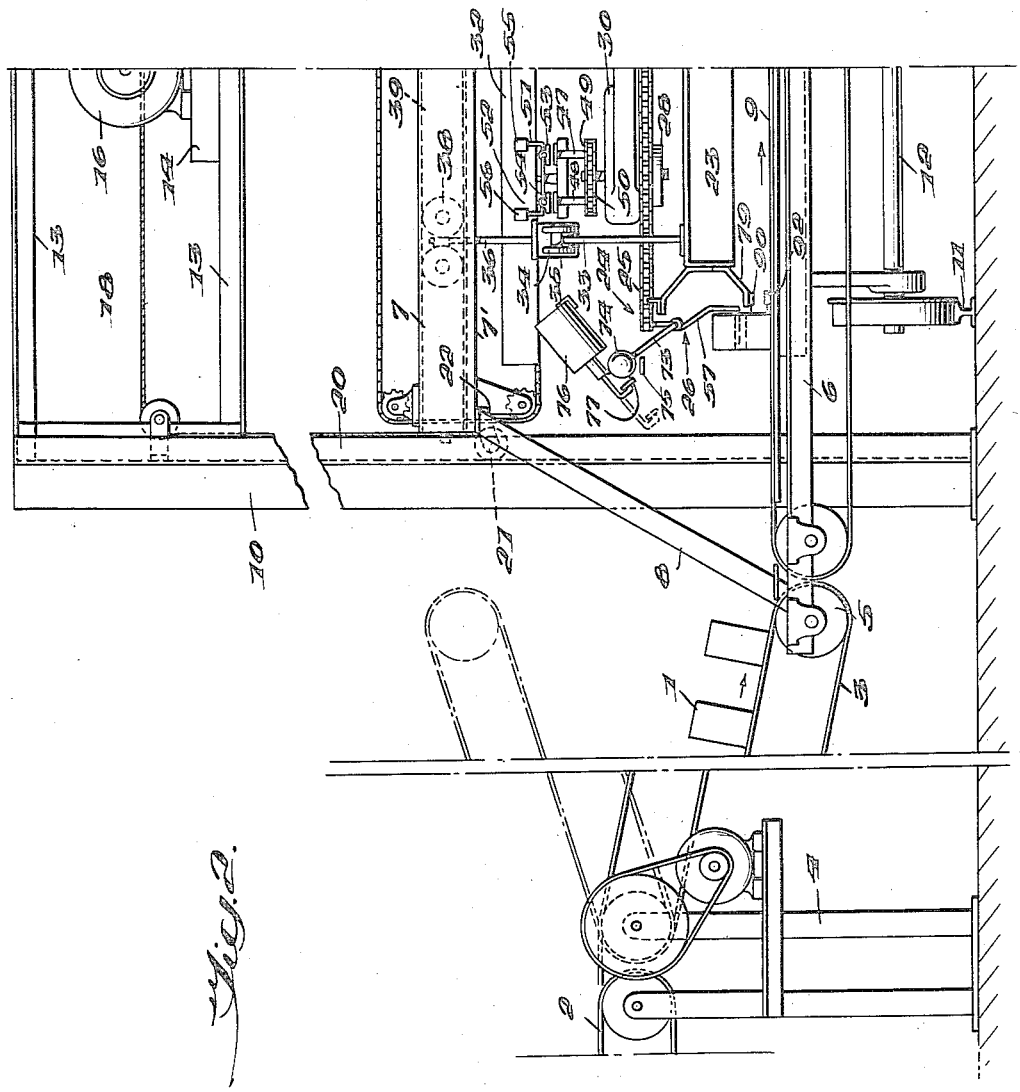

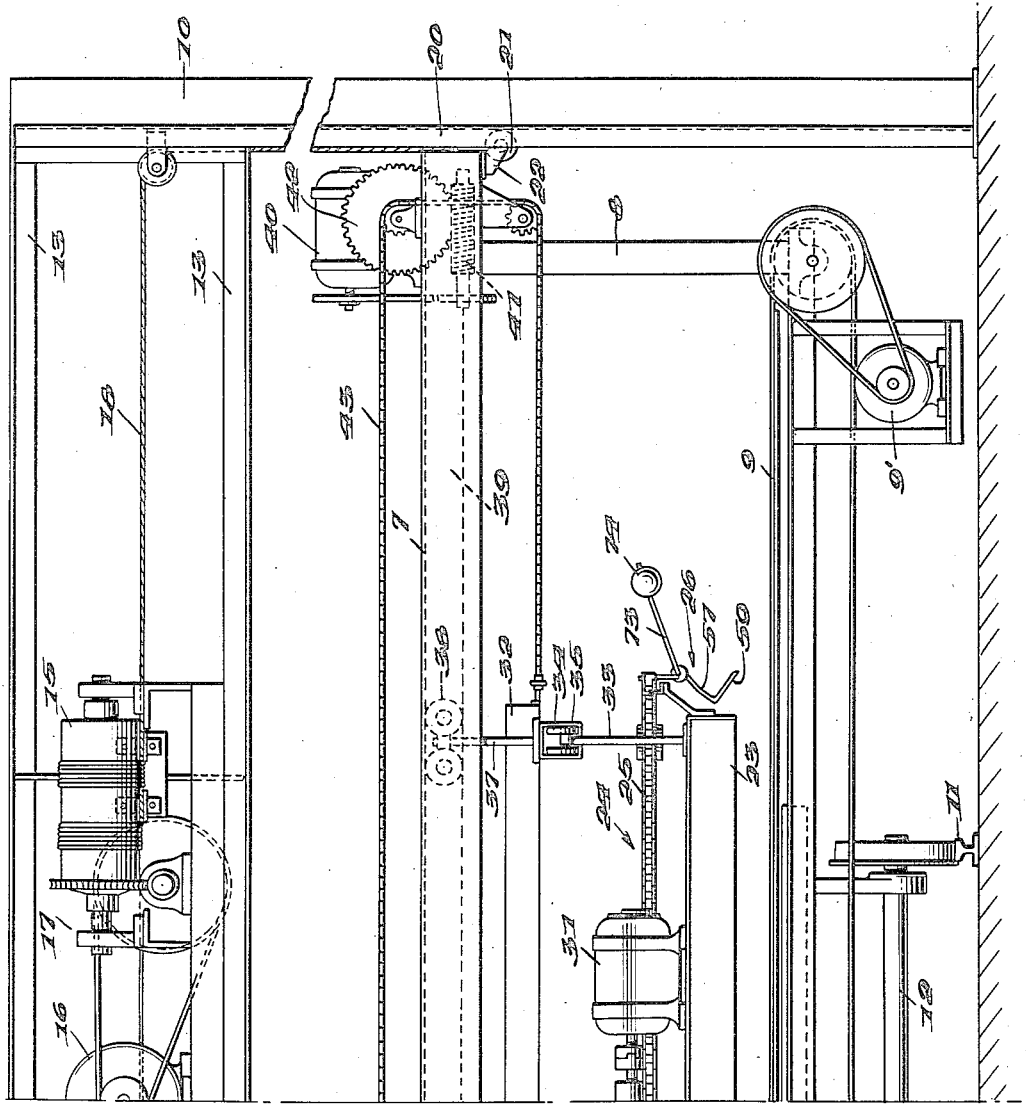

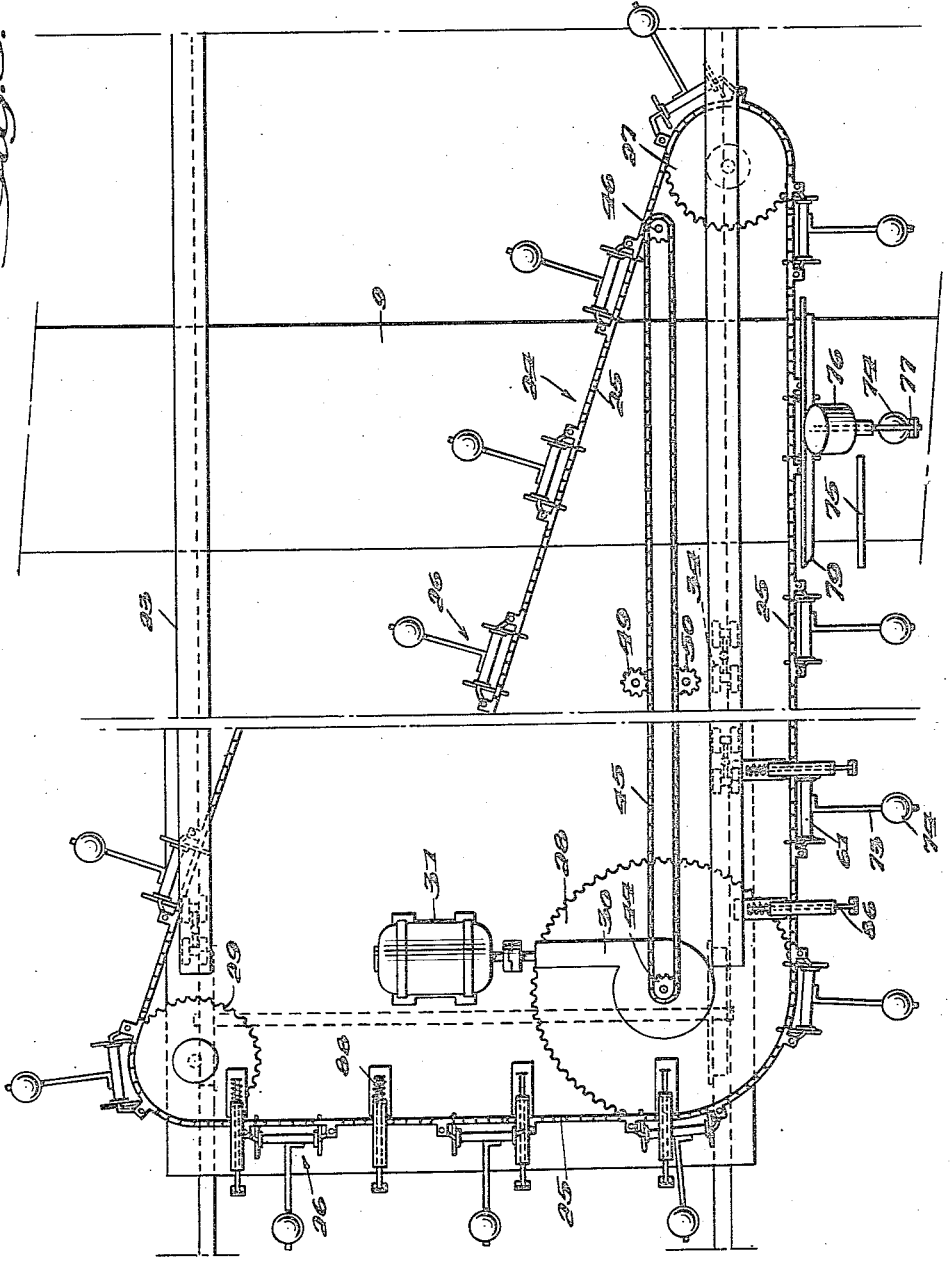

March 18, 1958
D. F. MAPLE
2,827,179
ARTICLE STACKING MACHINE
Filed March 5, 1956
12 Sheets-Sheet 6
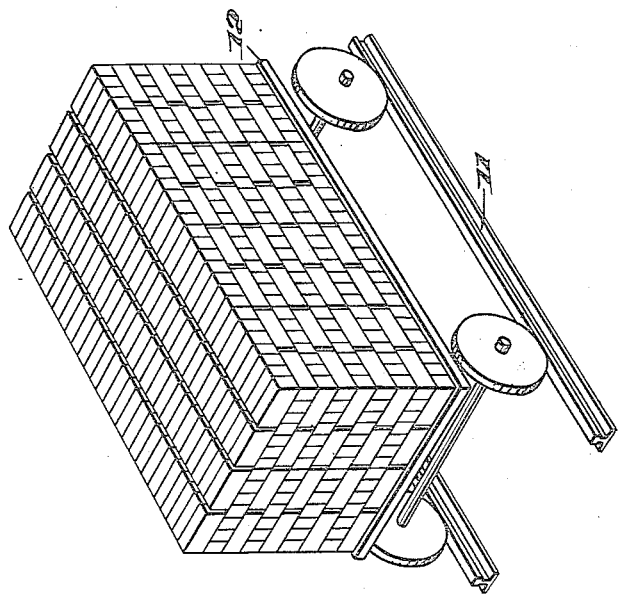
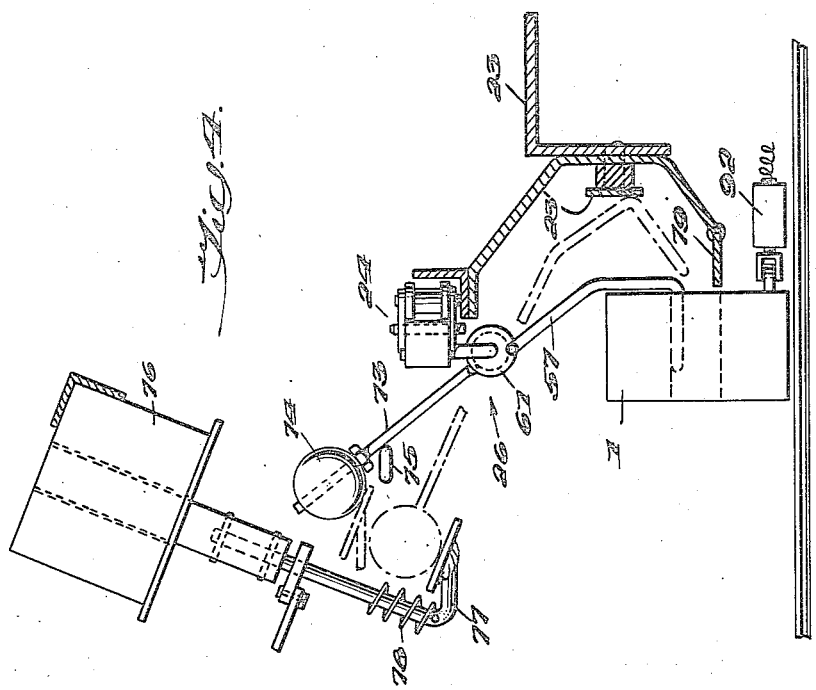
INVENTOR.
DONALD F. MAPLE,
BY
Stone, Boyden & Mack,
ATTORNEYS.

March 18, 1958 D. F. MAPLE 2,827,179
ARTICLE STACKING MACHINE
Filed March 5, 1956 12 Sheets-Sheet 7
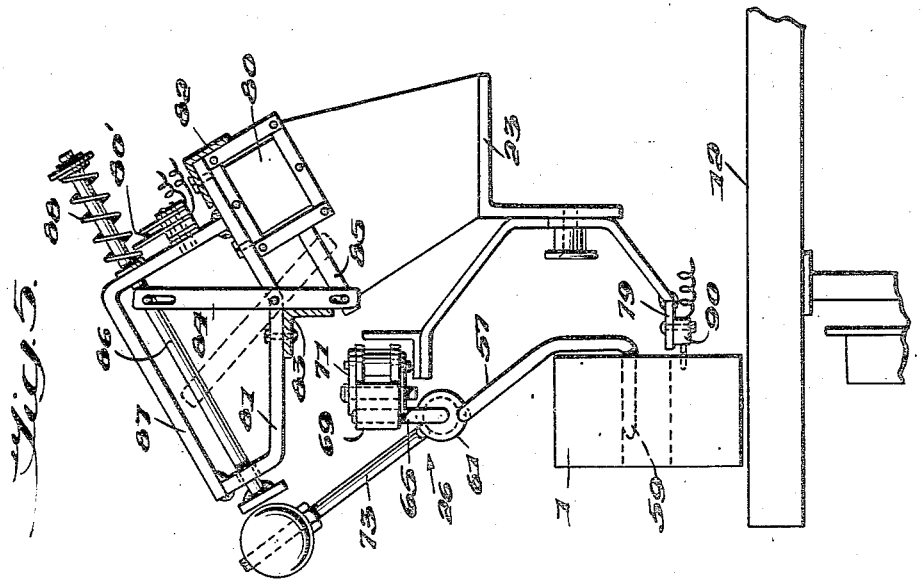
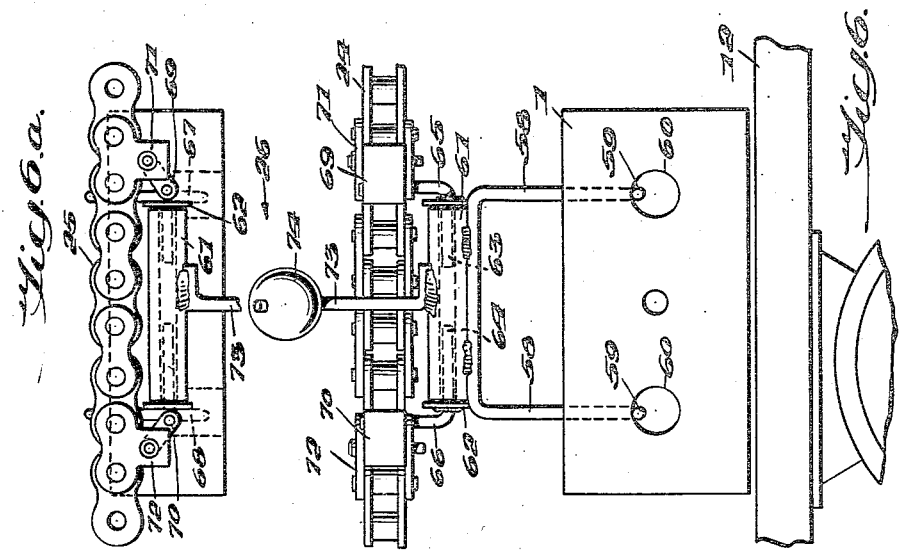
INVENTOR.
DONALD F. MAPLE,
BY
Stone, Boyden & Mack.
ATTORNEYS.

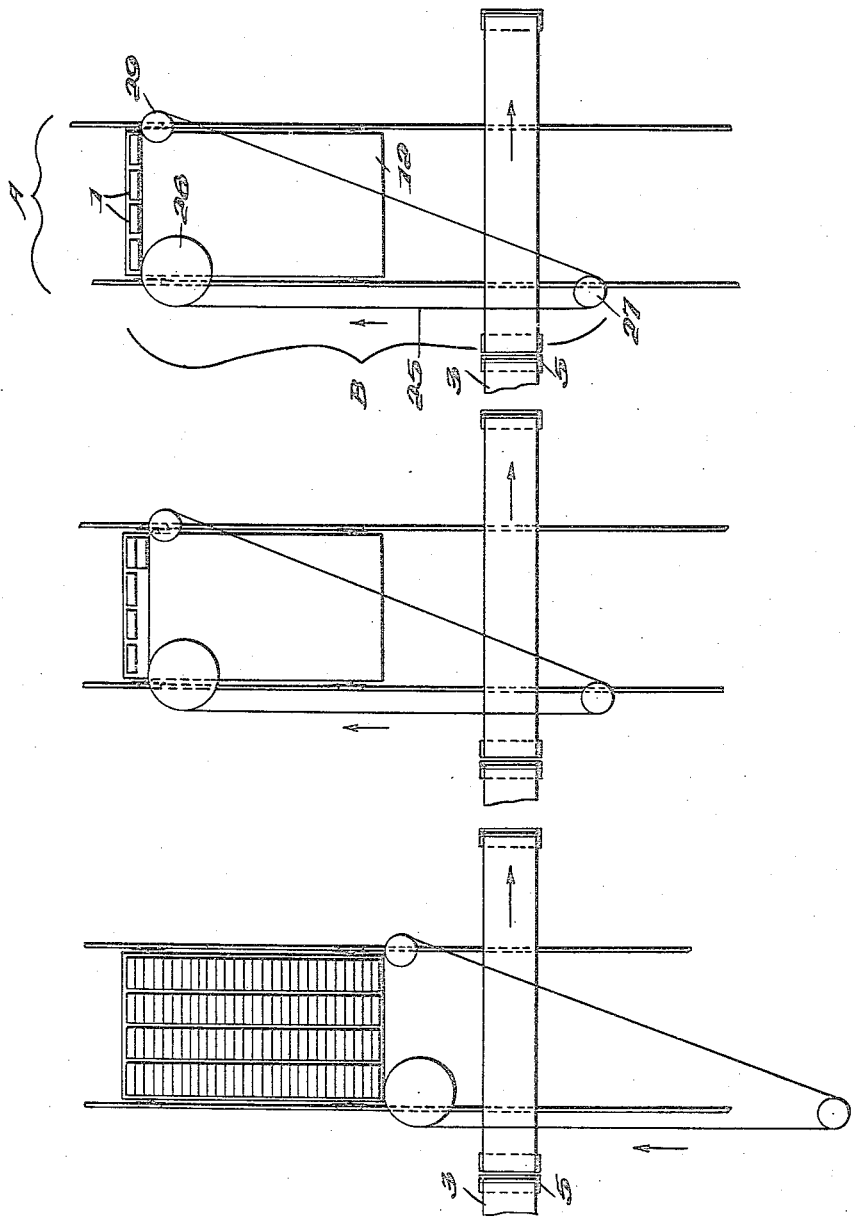

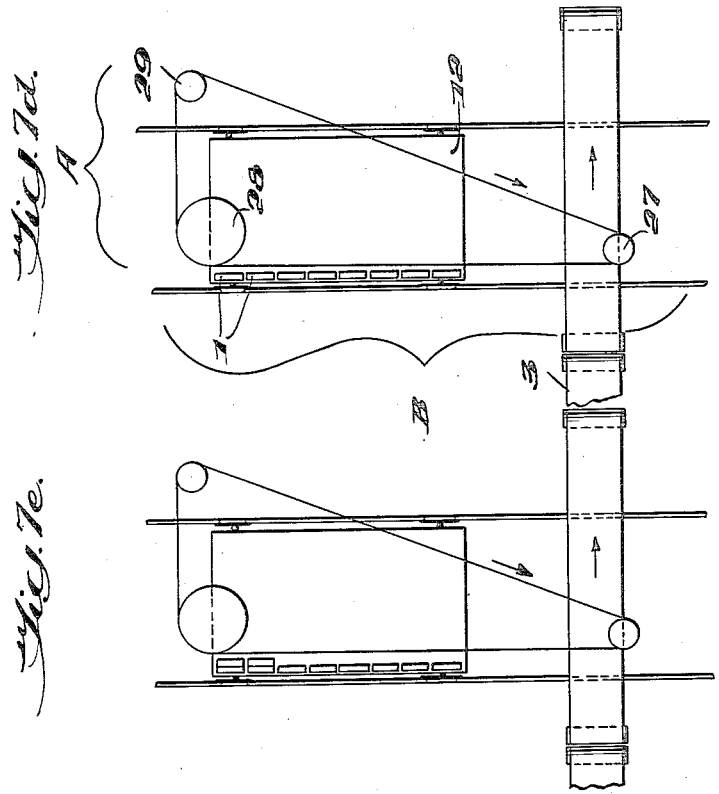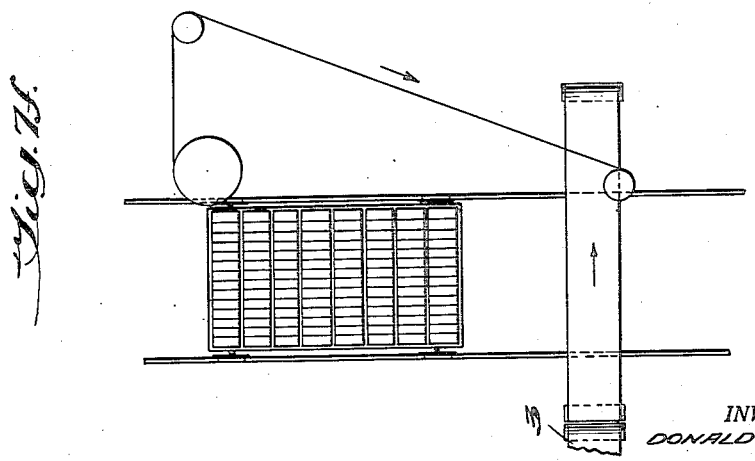

March 18, 1958
D. F. MAPLE
2,827,179
ARTICLE STACKING MACHINE
Filed March 5, 1956
12 Sheets-Sheet 10
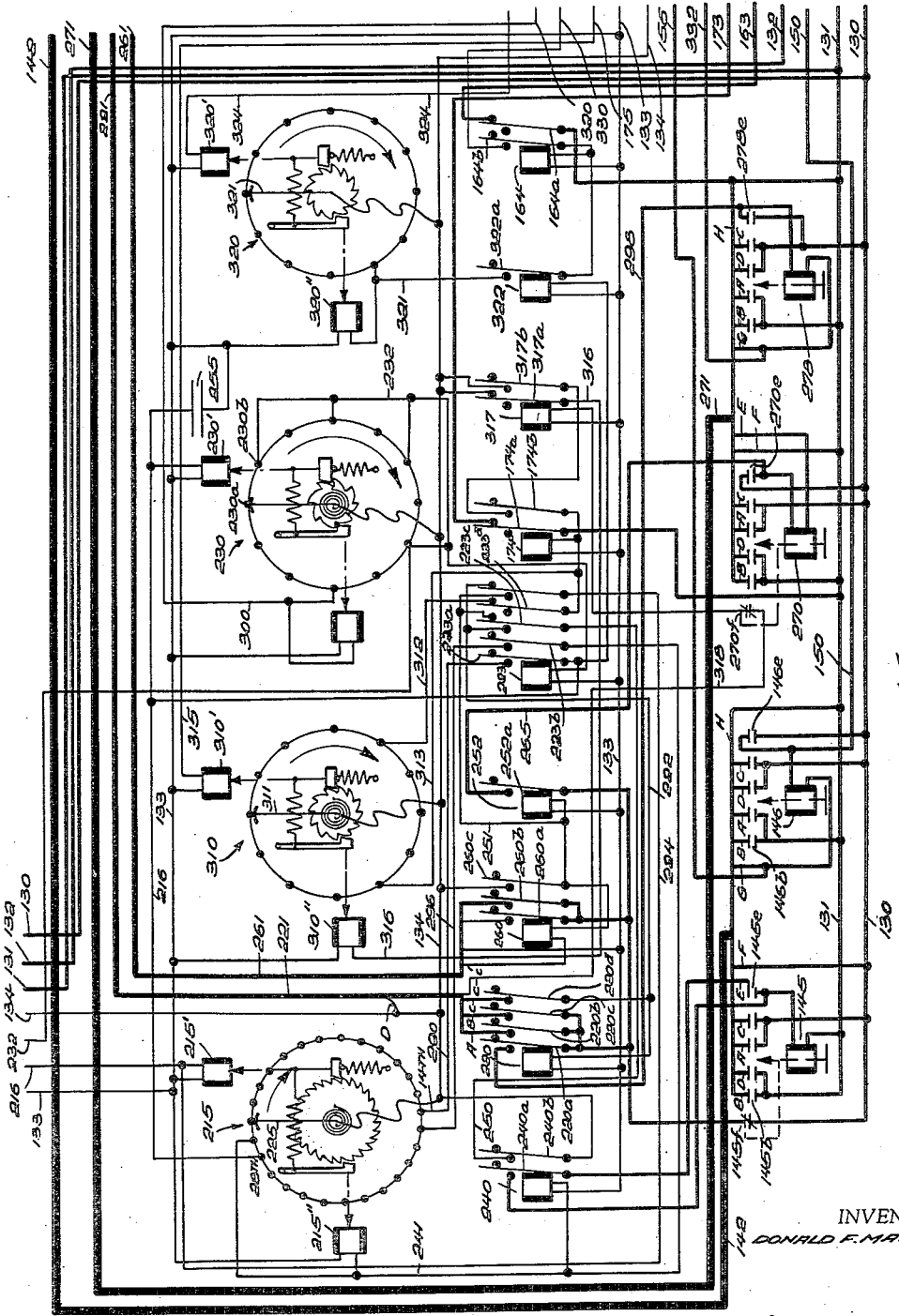
INVENTOR
DONALD F. MAPLE,
BY Stone, Boyden & Mack,
ATTORNEYS

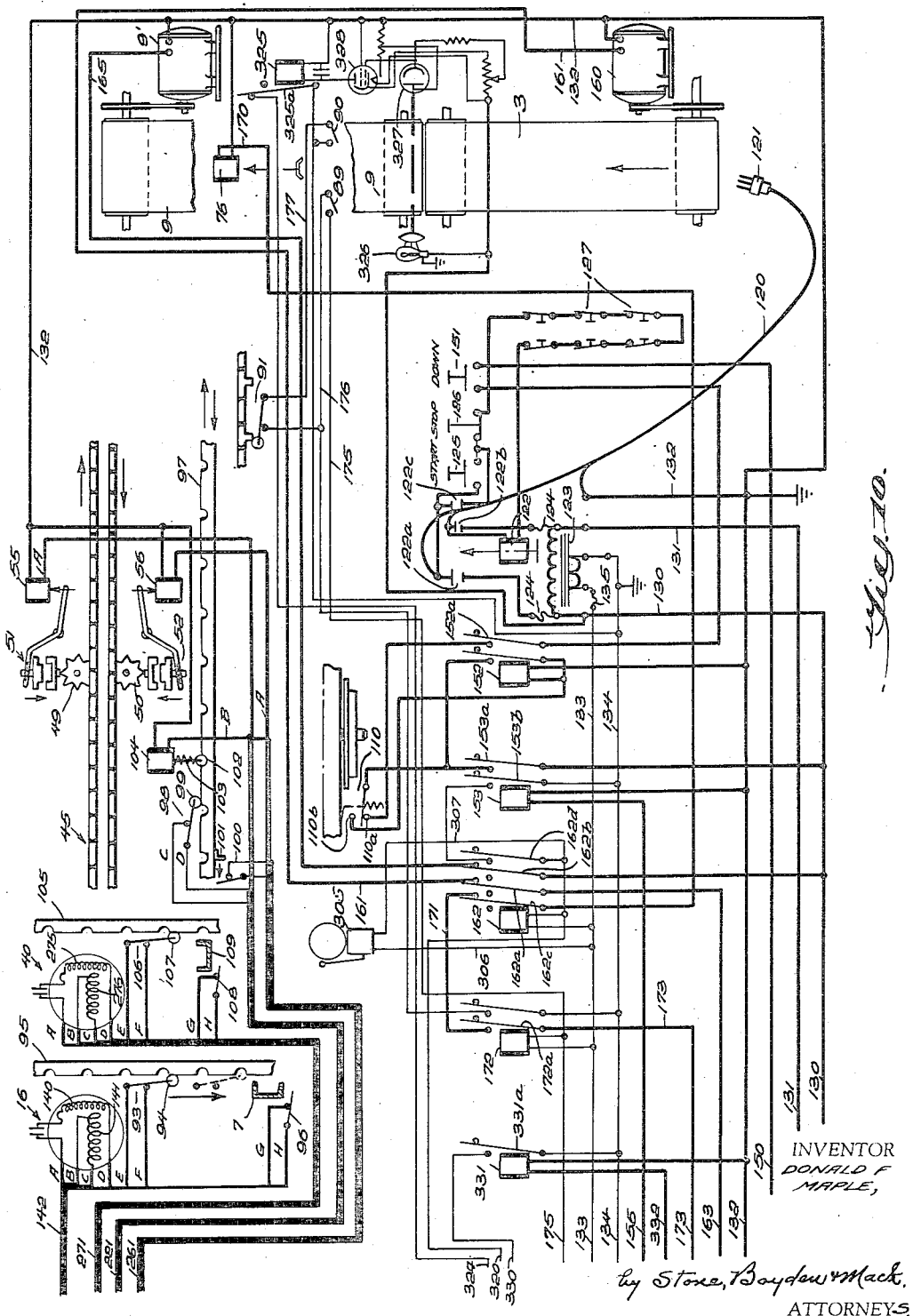

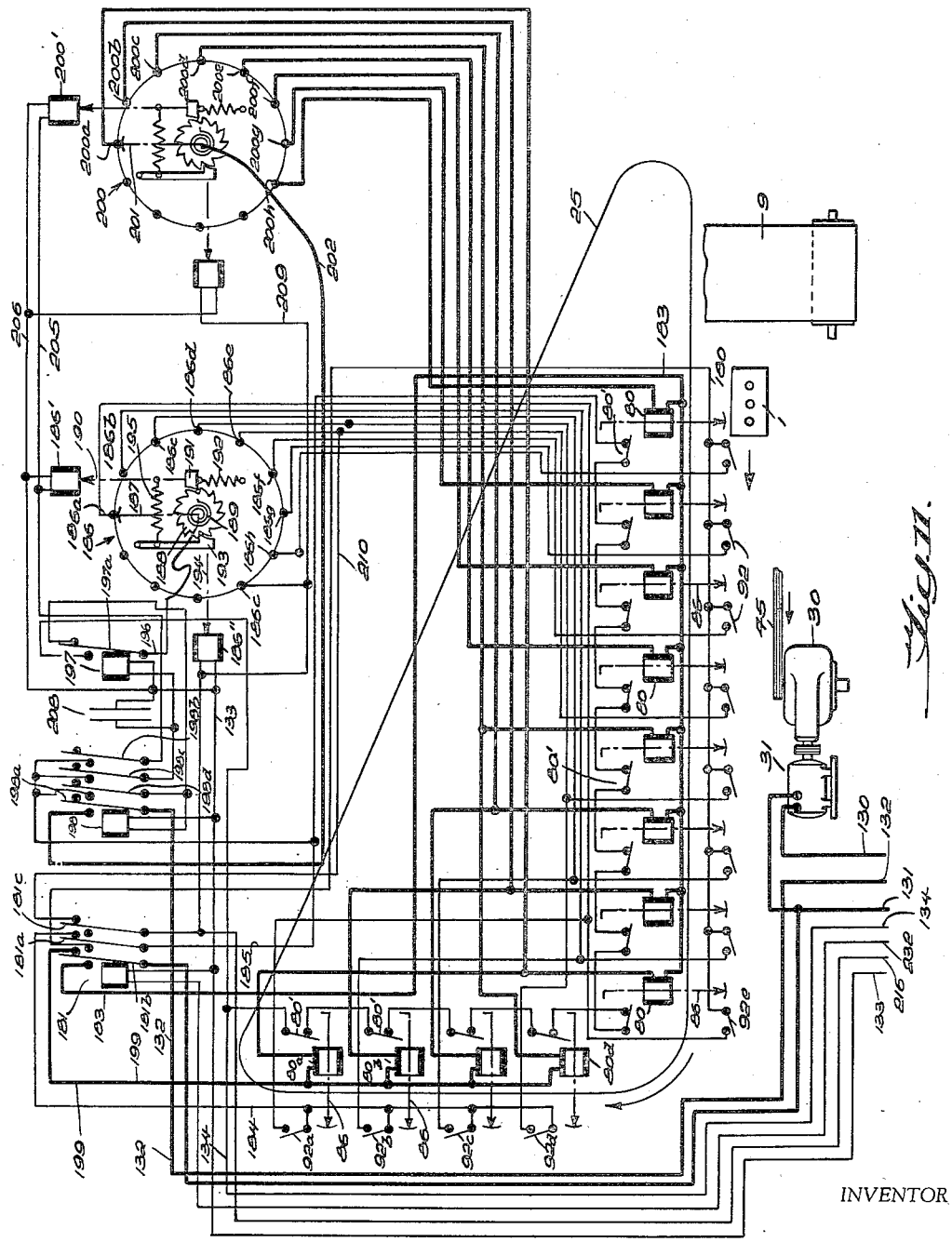

United States Patent Office 2,827,179
Patented Mar. 18, 1958

2,827,179

ARTICLE STACKING MACHINE

Donald F. Maple, Peoria, Ill.

Application March 5, 1956, Serial No. 569,377

24 Claims. (Cl. 214—6)

This invention relates to article stacking machines and more particularly to an improved machine for automatically stacking articles on a support in several layers with each layer consisting of at least two rows and the rows of one layer being angularly disposed with respect to the rows of the next adjacent layer.

While not limited thereto, the invention is particularly advantageous for stacking bricks on the small rail cars commonly employed to move the bricks about a brick yard during processing. The particular embodiment of the invention disclosed in detail hereinafter is adapted for this purpose and is constructed to stack the bricks layer on layer with the rows of one layer disposed at 90° to the rows of the next.

An object of the invention is to provide an article stacking machine of the type referred to which is completely automatic in operation.

Another object is to devise such a machine which is capable of stacking articles in layers, with the rows of successive layers angularly disposed, without requiring adjustment of the support on which the articles are stacked, and without requiring use of a multiplicity of article delivery means.

A further object is to devise a novel depositing conveyor for article stacking machines of the type referred to, such conveyor being particularly adapted for depositing first a layer consisting of several rows of articles extending in one direction, and then a layer consisting of several rows of articles extending in another direction.

Yet another object is to provide a machine of the type referred to which is relatively simple and economical, yet is positive and effective in carrying out the rather complicated series of operations which is inherent in such stacking operations.

In general, the invention provides a machine including the combination of an infeeding conveyor, a uniplanar endless depositing conveyor having two horizontally disposed straight line portions, and control means for the conveyors. The depositing conveyor is mounted above the position of the article receiver in such manner as to be adjustable horizontally in directions at right angles to the straight line portions, and also vertically so that, when one article layer has been deposited, space may be made between that layer and depositing conveyor to accommodate the next layer. The depositing conveyor picks up the articles, in sequence, as they are supplied by the infeeding conveyor, and carries the articles along said straight line portions. Special control means causes the depositing conveyor to first deposit articles in sequence along one of said straight line portions to form a first row or course of articles. Upon completion of such first row, the depositing conveyor is moved at right angles to the first row to make room for a second row which is deposited in the same manner as the first. This sequence is repeated until the first layer is completed. The depositing conveyor is then raised to allow space for another layer of articles. The next row of articles is then deposited as the articles travel along the other straight line portion of the depositing conveyor, the conveyor then moved at right angles to that row, the next row deposited, and so forth.

In order that the invention may be understood in detail, reference is had to the accompanying drawings, which form a part of this specification, and wherein:

Figs. 1 and 1a taken together constitute a side elevational view of a stacking machine constructed in accordance with one embodiment of the invention;

Figs. 2 and 2a taken together constitute an end elevational view of the machine of Fig. 1;

Fig. 3 is a fragmentary vertical sectional view, taken on line 3—3, Figs. 1–1a, on enlarged scale and showing parts in elevation;

Fig. 4 is a sectional view taken along line 4—4 of Fig. 1a and showing the pickup and support apparatus;

Fig. 5 is a fragmentary side elevational view of the article support and kickoff apparatus;

Figs. 6 and 6a are fragmentary side elevational and top plan views, respectively, of the article support apparatus;

Figs. 7a–7f are diagrams illustrating the manner in which the depositing conveyor is adjusted to accomplish the stacking operation;

Fig. 8 is a perspective view of a load of bricks as stacked by the machine of Fig. 1; and, Figs. 9–11 are electrical diagrams illustrating the control system employed in the machine.

*The infeeding conveyor means*

Figure 1A:
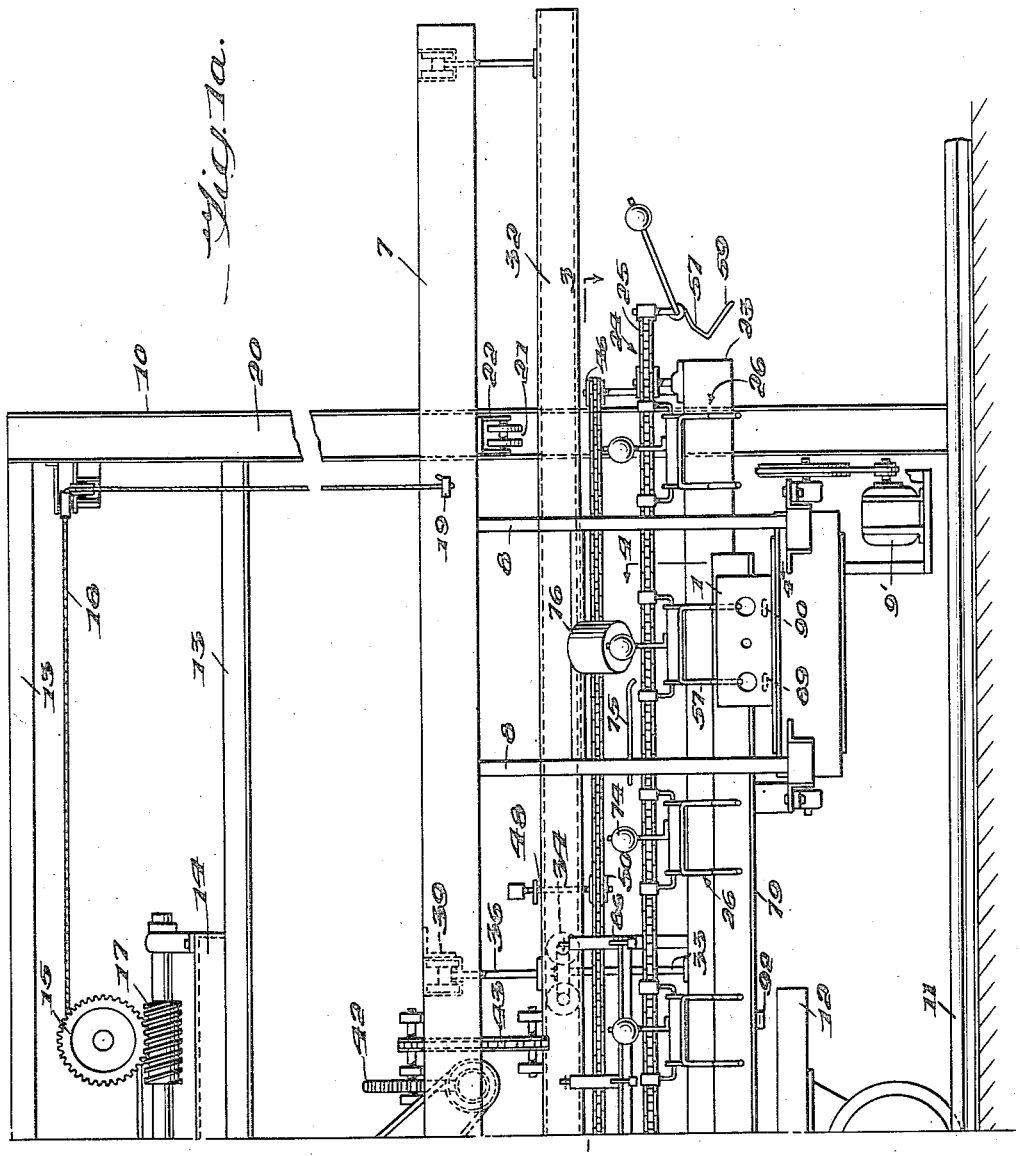

The articles 1 to be stacked, in this case bricks from a brickmaking machine, are fed (Fig. 2) in sequence and predetermined spacing and rate, by the usual delivery conveyor 2 to an endless infeeding conveyor 3. Conveyor 3 is pivoted at one end to stand 4. At its delivery end, roller 5 of conveyor 3 has its shaft journaled in bearings attached to spaced, parallel frame members 6. The frame members are rigidly supported on a vertically adjustable, horizontally disposed main carriage 7 by struts 8, Fig. 2. Also mounted on frame members 6 is a horizontally disposed endless conveyor 9, driven by a drive motor 9'.

Since the conveyor 3 is pivoted at both ends, and since the frame members 6 are rigidly supported, the conveyors 3 and 9 combine to form infeeding conveyor means operable to deliver the bricks to the machine in horizontal position regardless of the vertical adjustment of the main carriage 7.

*The main frame structure*

The main frame structure of the machine includes four uprights 10 positioned two on each side of the railway 11 for the brick cars 12. Two sets of horizontal cross members 13 are provided, connecting the tops of the four uprights as seen in Figs. 1 and 2. Supported on the lower ones of frame members 13 is a base 14 to which is secured a winch 15 and its vertical winch power motor 16 and worm drive gearing 17.

Winch 15 is equipped with a cable 18, the ends of which are rigidly attached at 19 to carriage 7, as seen in Fig. 1. As will be understood by comprising Figs. 1 and 2, the uprights 10 are provided, on their surfaces facing railway 11, with track members 20. Carriage 7 is of generally rectangular form, and its side members 7' are each provided with two guide rollers 21 working in the track members 20, the shafts of rollers 21 being journaled in brackets 22 secured to the bottoms of side members 7' as shown.

It is thus seen that frame 7 is free for vertical movement, both upwardly and downwardly, such movement being accomplished by operation of winch 15. As to horizontal movement, however, the frame 7 is rigidly fixed with respect to uprights 10 by reason of guide rollers 21 and track members 20. Assuming that the car 12 is in proper position, the frame 7 is then accurately positioned with respect to the car in the horizontal, but may be adjusted vertically above the car.

The depositing conveyor

Disposed horizontally below main carriage 7 is the generally triangular support 23 of a uniplanar depositing conveyor 24 comprising an endless sprocket chain 25 equipped with a plurality of equally spaced article carriers 26 hereinafter described in detail. The chain 25 extends over three sprocket wheels 27–29, as seen in Figs. 3 and 7, so that the chain always traverses two straight lines A and B, Fig. 7a, extending along adjacent sides of support 23, said lines being at right angles to each other and each parallel to a different side of the car 12 when the car is in position to be loaded. Sprocket wheel 28 is driven, through gear box 30, by an electric motor 31 mounted on carriage 23.

Support 23 is supported from an intermediate carriage 32 by means allowing movement thereof lengthwise of car 12, while intermediate carriage 32 is supported from main carriage 7 by means allowing movement transversely of car 12. By such support, the depositing conveyor is free to be moved step-by-step at right angles to straight line A, so as to deposit rows of bricks parallel to that line, or at right angles to line B, so as to deposit rows of bricks parallel to that line, as will be explained in detail hereinafter. Support 23 is mounted by struts 33 secured at their lower ends to the support and at their upper ends to small trucks in which are journaled the shafts of rollers 34. Rollers 34 work in guide channels 35, the channels being of generally rectangular cross-section but having a bottom slot to allow free passage of struts 33, as seen in Figs. 2 and 2a. The channels 35 are fixed rigidly to carriage 32 and extend lengthwise of the car 12. Similarly, support of intermediate carriage 32 is by struts 36, the lower ends of which are fixed to the carriage while the upper ends are secured to trucks 37 carrying rollers 38 working in guide channels 39. Channels 39 are like channels 35 in shape, but are secured to main carriage 7 and extend transversely of car 12.

The depositing conveyor adjusting means

As seen in Figs. 1, 1a and 2a, main carriage 7 carries a horizontal drive reversible electric motor 40 arranged to drive, as through a suitable belt and pulleys, a worm 41 and worm gear 42. Fixed to the shaft of gear 42 is a sprocket engaged with sprocket chain 43, the chain extending over suitable idler sprockets carried by carriage 7. The ends of the chain 43 are attached to the sides of intermediate carriage 32. Thus, when motor 40 is driven in one direction, carriage 32 will be moved transversely to the left of car 12, as viewed in Figs. 2 and 2a, while actuation of the motor in the opposite direction will cause carriage 32 to move transversely to the right. Since the mounting means comprising struts 33 and rollers 34 prevents relative transverse movement between support 23 and carriage 32, the support, and so conveyor chain 25, are moved transversely of car 12 whenever carriage 32 is moved. This movement of support 23 will hereinafter be referred to as toward-and-away movement of the support, with respect to an operator facing the side of the apparatus, as shown in Figs. 1 and 1a.

Gear box 30 includes an upper output shaft to which is fixed a sprocket 44, as shown in Figs. 1 and 3, engaged with an endless sprocket chain 45 disposed longitudinally of support 23. At the end of the support opposite gear box 30, the chain 45 is supported by an idler sprocket 46 suitably mounted on support 23. Journaled in bearings fixed to carriage 32 are two vertical shafts 47 and 48 to the lower ends of which are respectively secured sprocket wheels 49 and 50, as seen in Figs. 1a, 2 and 3. As seen in these figures, sprocket 49 is engaged with one "run" of chain 45 while sprocket 50 is engaged with the other. Though otherwise free to rotate, shafts 47 and 48 are equipped with electromagnetically actuated clutches 51 and 52, respectively, each clutch including a part fixed to the shaft and a part which is movable into and out of engagement but is fixed against rotation. Spring biased to normally disengaged position, the movable members 53 and 54 of the clutches are actuated to engaged position by electromagnets 55 and 56, respectively.

Viewing the machine as seen in Fig. 1, it will be understood that motor 31 rotates in a direction to drive conveyor chain 25 in such manner that the "run" of chain 25 seen in Fig. 1 proceeds to the left. Chain 45 being driven by the same gear box, it will be understood that the back "run" of chain 45 travels to the right, while the front "run" moves to the left. Thus, since sprocket 49 is engaged with the back run of the chain 45, engagement of clutch 51 by action of electromagnet 55, causing sprocket 49 to stop rotating and therefore to travel with the chain 45, results in movement of support 23 to the right. Conversely, since sprocket 50 is engaged with the front "run" of chain 45, engagement of clutch 52 by action of electromagnet 56 results in movement of support 23 to the left.

In the foregoing, description of the vertical and horizontal adjusting means has been limited to the mechanical actuating features. Limit provisions and other control features are discussed hereinafter.

The depositing conveyor article handling means

As seen particularly in Figs. 4–6 and 6a, the article handling devices or carriers 26 carried by depositing conveyor chain 25 each comprise a hook-like article support 57 which is generally in the shape of an inverted U in front elevation, the legs 58 terminating in forwardly extending prongs 59 spaced apart at the proper distance to engage in the usual holes 60 of bricks 1. The top of support 57 is welded to a sleeve 61 which embraces an inner sleeve 62 provided with flanged ends, as seen in Figs. 5, 6 and 6a. This structure is supported by pivot pins 63 and 64 extending through and being welded respectively to brackets 67 and 68. By means of pivot pins 69 and 70, the brackets are respectively pivoted to lugs 71 and 72 carried by chain 25. Pin 64 is welded to one flanged end of inner sleeve 62, while pin 63 is free to slide within the opposite end portion of that sleeve. This arrangement compensates for curvatures of conveyor chain 25 as the chain passes over its sprocket wheels.

Welded to outer sleeve 61 and extending upwardly and outwardly relative to the conveyor is a rigid arm 73 carrying at its tip a counterweight 74. As will be understood from Figs. 4 and 5, this counterweight normally biases the article support 57 to a position in which prongs 59 will clear any bricks already deposited by a preceding support 57, the position shown in dashed lines in Fig. 4. This inactive position is determined by a stop element 23' extending along a portion of the periphery of support 23, as shown in Fig. 4. Stop element 75, mounted in any suitable fashion, as on the left hand one of struts 8 (viewing the device as in Fig. 1a), is also provided to hold the article support in operative position for a short time after the pickup operation.

To actuate the support 57 adjacent the pickup station into a position in which the prongs 59 are engaged with the brick to be conveyed, there is mounted on intermediate carriage 32 adjacent conveyor 9 a pickup solenoid 76, as shown particularly in Fig. 4, the free end of the plunger thereof being hooked and provided with an actuating plate 77 positioned for engagement with the counterweight 74. Upon energization of solenoid 76, the plunger is drawn upwardly, raising the counterweight and so causing support 57 to pivot outwardly into the position shown in full lines in Fig. 4, so as to engage brick 1 which has been positioned as hereinafter described. When the solenoid is deenergized, the plunger is returned to its lowermost position by spring 78.

Spaced along the straight line runs A and B of the depositing conveyor are a plurality of article discharge actuators, or kickoff solenoids, each constructed to cooperate with any of the article handling devices 26 in the manner seen in Fig. 5. Essentially, each of these actuators is an electromagnetically operated pusher disposed to engage the counterweight 74 and move the same outwardly, causing support 57 to be pivoted inwardly, while the brick is stripped off prongs 59 by stop member 79. Each actuator comprises an electromagnet or solenoid 80 bolted to a base strip 81 mounted on supporting members 82 and 83 which extend parallel to the conveyor chain 25 and are mounted on support 23. A lever 84 is pivoted to strip 81 and, at its ends, to plunger 85 of the electromagnet and to push rod 86, respectively. Push rod 86 works in aligned bores in strip 81 and guide member 87 and is positioned to engage counterweight 74 whenever one of the devices 26 is in alignment with the article discharge actuator and the solenoid is actuated. The push rod is normally held in inactive position by biasing spring 88. When electromagnet 80 is energized, lever 84 is pivoted to move push rod 86 outwardly and downwardly into contact with the counterweight 74.

Each of kickoff solenoids 80 also carries normally closed switch 89' which is opened by plunger 85 when the solenoid is energized.

It will be understood that the article discharge actuators are spaced along lines A and B at distances determined by the size of the articles to be stacked and the spacing desired between the articles when deposited. Also, from Fig. 5, it will be noted that the apparatus is so constructed that inward pivoting of the support 57, and the stripping action of stop member 79, causes the brick or other article to drop precisely into the desired position on the support, or on the layer of articles last deposited.

*Disposition of article sensing control switches*

From Figs. 1, 1a and 2, it will be noted that stop member 79 is a continuous rail secured to two sides of support 23 (these sides being adjacent to depositing conveyor "runs" A and B) and extending downwardly and outwardly to terminate adjacent the path of travel of the bricks being handled by the depositing conveyor. Further, it will be noted that one end of this rail extends across conveyor 9 to lie in the line of travel of the bricks being fed into the machine.

Two normally open pick-up position switches 89 and 90 are mounted on this rail close to the surface of conveyor 9 and, as seen in Fig. 1a, are so positioned that their actuating elements are contacted by the incoming brick near the ends thereof. These switches are aligned at right angles to the line of travel of conveyor 9 and parallel to run B of the depositing conveyor. The actuating elements of switches 89 and 90 are spring biased outwardly and so arranged that both switches are closed only when the brick 1 has arrived at the pickup station and, by reason of the position of the switches, assumed a position at right angles to the direction of travel of conveyor 9.

Mounted on support 23 and positioned with its actuating member in the path of travel of lugs 71 and 72 on chain 25 is a limit switch 91. Switch 91 is so located that it will be actuated by lugs 71 only when one of the article handling devices 26 is in such position that its prongs 59 are aligned with the holes of the brick to be picked up.

As will be explained in detail hereinafter, switches 89–91 are so connected that pickup solenoid 76 cannot be energized to actuate the corresponding article handling device 26 unless all three switches are closed.

Also mounted at equally spaced positions on stop member 79 are deposit switches 92, the number of said switches being equal to the number of bricks to be deposited along lines A and B, and said switches being so disposed that the actuating element of each deposit switch will be contacted by the bricks as they are carried along by the depositing conveyor. Deposit switches 92 are connected to control discharge or kickoff solenoids 80 in the manner hereinafter described.

Mounted adjacent the railway for cars 12, and in position for actuation to closed position by contact with a suitable part of the car when the car is properly positioned to receive articles from the depositing conveyor, is a normally open car sensing switch 110, Fig. 10.

*Conveyor adjusting limit switches*

As has been described, elevation of the conveyor is accomplished by motor 16. As will be explained hereinafter, motor 16 is energized automatically when the first layer of bricks is complete. The elevating operation is terminated by a limit switch 93, Fig. 10, which switch is provided with a pivoted actuating member provided at its tip with a roller 94 disposed to travel along a notched track 95 mounted on one of the uprights 10, Fig. 1. The notches in track 95 are so disposed that roller 94 enters one notch just before the carriage 23 is raised by the desired amount, so that elevation of the carriage 23 one full step causes roller 93 to pass the notch and, as will be seen later, reset the elevating control means for the next cycle.

Adjustably mounted on one upright 10 is a lower limit switch 96. This switch is disposed with its actuating element in the path of travel of frame 7 and serves to stop vertical movement downwardly of the support 23 when the apparatus has reached a position for stacking the first layer of bricks.

Secured to support 23 and extending parallel to endless sprocket chain 45 is a track 97 provided with a plurality of equally spaced notches. A transverse course limit switch 98 is mounted on intermediate carriage 32 and is so disposed that roller 99 of its actuating member engages the notches of track 97 in sequence as support 23 is moved relative to track 32. Limit switch 98 is normally closed, opening each time roller 99 drops into one of the notches of the track. The notches of track 97 are spaced according to the size of the articles being stacked and are so oriented that, during each cycle of operation, roller 99 drops into one of the notches of track 97 and then rides out again, resetting the transverse course control mechanism for the next cycle.

Also carried by intermediate carriage 32 is a first transverse course limit switch 100, operated by contact with abutment 101 on support 23. This limit switch terminates movement of conveyor 23 to the left, as viewed in Fig. 1, each time that support is moved into position to commence depositing a layer of transverse courses parallel to line A.

As seen in Fig. 10, there is also provided in cooperation with track 97 an electromagnetic brake comprising brake element 102, normally urged into engagement with the track by spring 103 and actuated to inactive position by electromagnet 104. This brake is mounted on support 32 and operates in synchronism with limit switch 98 to lock support 23 in place at the end of each adjustment by chain 45.

Mounted on support 23 at right angles to track 97 is a second track 105 provided with a series of equally spaced notches. Mounted on carriage 32 and cooperating with track 105 is a longitudinal course limit switch 106, this switch being normally closed and provided with a roller 107 to successively engage the notches of track 105. The notches of track 105 are spaced in accordance with the width of the articles to be stacked and are so disposed that, for each movement of support 23 adequate to provide room for an additional longitudinal row, the roller 107 drops into one of the notches, opening switch 106 to provide the terminating control action, and then rides out of such notch, resetting the switch for another operation.

Also carried by carriage 32 is a first longitudinal course limit switch 108, this switch being normally closed but actuated to open position by contact with abutment 109 on support 23. This limit switch terminates movement of support 23 forwardly, as viewed in Fig. 1, each time the support is actuated into position to commence depositing a layer of longitudinal courses parallel to line A.

*Movements of support 23 and depositing conveyor*

Referring now to Figs. 7a–f, the various movements of the support and the depositing conveyor 24 which must be provided by the electrical apparatus described below, in order to stack brick (or other articles) in the manner shown in Fig. 8, will now be described.

Fig. 7a shows the conveyor in position for depositing the first row of the first layer on the receiver or car 12, one row of four bricks already having been deposited parallel to run A. The conveyor and its support 23 then move in a direction perpendicular to run A by a distance determined by the width of the bricks and the desired spacing between adjacent rows. The support stops and the conveyor then advances brick along run B and run A to deposit a second row parallel to the first row, this position of the support and conveyor then being as shown in Fig. 7b.

The conveying and depositing operation then continues, with the support moving in the manner described between deposit of adjacent rows, until one complete layer of bricks has been deposited on the car, the condition shown in Fig. 7c.

It is next desired to deposit the second layer of bricks, with the rows thereof arranged perpendicularly of those of the first layer. In order to provide for this operation, the support 23 and conveyor 24 must be moved vertically upwardly by a distance equal to the height of the bricks, the support and conveyor must be moved to the uppermost end of the car, as shown in Fig. 7d (to the far left of the operator) and the support and conveyor must be moved toward the right of the figure, or away from an operator facing run B, by a distance such that the first row of bricks deposited by the conveyor will be positioned along the left-hand edge of the car. The apparatus then deposits the first row of the second layer, as shown in Fig. 7d.

In order to deposit the next row of bricks, the support and conveyor must move to the right of Fig. 7d, by a distance determined by the width of bricks and the desired spacing between rows, to the position shown in Fig. 7e. The support stops its movement and depositing of the second row of bricks begins.

This operation of depositing a row, then movement of the support, then depositing another row, continues until the second layer has been deposited, Fig. 7f. The support and conveyor must then be moved to the position for stacking the third layer. In order to provide for this, the support and conveyor are moved vertically upwardly one step, the support is moved toward the operator (to the left of Fig. 7f) to the limit of its travel, and the support is moved toward the right of the operator (downward in Fig. 7f) one step, to the position shown in Fig. 7a. The third layer is then deposited in the same manner as the first layer. After the third layer has been deposited, the support moves to the position of Fig. 7d in the same manner as described in connection with transition between the first and second layers, and the fourth layer is deposited.

The above described operations are repeated until the desired number of layers has been deposited, when the apparatus is stopped.

*Electrical power circuits*

Referring first to Fig. 10, power is supplied to the apparatus of the present invention through a three lead cable 120 which may be connected by conventional three-pronged connector 121 to the conventional three-wire 110–220 volts power main. Two of the power leads are connected through the normally open contacts 122a and 122b of solenoid contactor 122 to the opposite terminals of the primary of the transformer 123. Fuses 124 are furnished for the primary circuit in both sides of the line.

Solenoid contactor 122 is operated by depressing the button of start switch 125 which is connected between one lead of the power cable and one terminal of a normally closed stop switch 126. The other terminal of stop switch 126 is connected through a series of six limit switches 127 to one side of the coil of solenoid contactor 122. Limit switches 127 are disposed to be actuated by movement of the support 23 beyond the normal limits of movement in each of the 6 directions of support movement. The limit switches are normally closed and are only actuated if the other switches subsequently to be described which control the operation of the system fail to operate to stop movement of the support when it reaches the limits of its movements.

The other side of the solenoid contactor coil is connected to a second lead of the power cable 120. The result of these connections is that solenoid 122 is operated when the start button is depressed, closing its contacts 122a, 122b and 122c. Contact 122c shunts the start switch 125, so that the start switch may be released after being momentarily depressed. The left-hand side of the primary of transformer 123 is connected to power lead 130, while the right-hand side of the primary is connected to power lead 131. The third lead of power cable 120 is connected to lead 132 which is grounded to the chassis. Consequently, between each of leads 130 and 131 and ground there is 110 volts A.-C. power while a total of 220 volts appears between leads 131 and 132.

Transformer 123 is of the step-down type, and its secondary supplies power for operation of small relays used in the apparatus. The secondary coil is connected across leads 133 and 134 which may conveniently supply 30 volts A.-C. across their terminals. Lead 134 is preferably connected to chassis ground. A fuse 135 is inserted between the hot transformer secondary terminal and lead 133 to protect the apparatus.

Depositing conveyor motor 31, Fig. 11, is connected directly across leads 130 and 131, so that the motor is energized as soon as the start switch is operated, to begin driving the depositing conveyor 25. The conveyor drive obviously operates continuously until the stop switch is actuated, unless one of the limit switches operates or a power breakdown occurs.

*Depositing conveyor positioning*

Before a stacking operation is begun, assuming that a car 12 has previously been stacked with brick by the apparatus of the invention, it is first necessary to remove the car from the stacking station, and replace it with an empty car, and then to lower the support 23 and conveyor 24, which are in their uppermost vertical positions at the end of a stacking operation, into position to begin depositing brick.

In order to lower the support to the lowermost position thereof, the vertical winch motor 16, Fig. 10, must be actuated. The winch motor is of a conventional reversible type which need not be fully described. Suffice it to say that the motor includes coils 140 and 141, one coil being supplied with current of one phase to drive the motor in one direction and of the opposite phase to drive the motor in the opposite direction, coil 141 being supplied with current through leads B and C of the cable 142. Coil 140 is connected across leads A and D of the same cable. Cable 142 is connected in Fig. 9 through the normally open contacts of a pair of solenoid contactors 145 and 146 to power leads 130 and 131. Which of the contactors is energized determines in which direction the vertical winch motor 16 rotates. Leads A—D of cable 142 are connected through the corresponding normally-open contacts of the contactors to the power leads, contacts 145b and 145d being connected to lead 131 and contacts 145a and 145c being connected to lead 130. Similarly, leads A—D are connected through solenoid contacts 146a through 146d, respectively, to the power leads, contacts 146a and 146b being connected to power lead 131 and 146c and 146d being connected to lead 130.

When either of solenoid contactors 145 and 146 is energized, leads B and C of cable 145, and hence coil 141 of the vertical winch motor 16, are connected to power leads 131 and 130, respectively, so that the coil is energized with the same phase voltage, no matter which of the contactors is operated. However, when contactor 145 is energized, lead A is connected to power lead 130, and lead D is connected to lead 131, while the opposite connections are made when solenoid contactor 146 is energized. Consequently, coil 140 is supplied with voltages of opposite phases, depending upon which of contactors 145 and 146 is energized. Solenoid 145 is operated in order to rotate the winch motor in such direction as to raise the depositing conveyor 24, while solenoid 146 operates to cause the motor to lower the conveyor.

One terminal of the operating coil of solenoid 146 is connected to lead 150 which is connected in Fig. 10 to one terminal of the normally open push-button down switch 151. The other terminal of the down switch is connected to one of the swingers 152a of a relay 152. When the relay is energized, swinger 152a is connected in circuit with contact 110a and car position detector switch 110. When a car is in position, as related above, switch 110 is in the position shown, so that swinger 152a is connected to a contact of a relay 153 which makes contact with a swinger 153a when the relay is energized. Swinger 153a is connected to lead 130, a power lead.

The other side of the operating coil of solenoid contactor 146 is connected through lead G of cable 142, in Fig. 10, to one side of lower limit switch 96. The lower limit switch is closed whenever the carriage is in other than its lowermost position, so that at this time lead G is connected by the switch to lead H of cable 142, and lead H is connected directly to power lead 131 in Fig. 9. Consequently, when a car is still on the track, and the conveyor 24 is in its uppermost position, in order to lower the conveyor to a lower position, down switch 151 must be operated, and relays 152 and 153 must be energized. One side of the coil of relay 152 is connected directly to ground lead 132. The other side of the coil is connected to contact 110b of switch 110. Switch 110 is a single pole, double throw switch which is operated by the presence of a car to cause its contactor to touch contact 110a. It is evident, therefore, that relay coil 152 cannot be actuated until the car is removed from its position below the conveyor. When the loaded car is removed from the track, switch 110 moves its swinger to touch contact 110b, so that the ungrounded side of the coil of relay 152 is connected to the contact of relay 153 which cooperates with swinger 153a when the relay is operated.

One side of the operation coil of relay 153 is connected directly to ground through lead 132, while the other side is connected to lead 155. Lead 155 in Fig. 9 is connected to lead G of cable 142, so that lead 155 is connected to power lead 131 when the down limit switch 96 is operated, as above explained.

With the down limit switch closed, relay 153 operates to close swinger 153a on its contact and provide energizing power through switch 110 to the coil of relay 152. Relay 152 then operates and locks in through its swinger 152b, which shunts the car position sensing switch 110. After the loaded car has been removed and a new car placed on the track under the carriage, switch 110 is again moved to furnish a circuit through contact 110a thereof. At this time relays 152 and 153 are operated and switch 110 is in the proper position so that, when down switch 151 is depressed, power is furnished to the operating coil of solenoid contactor 146. The contactor then operates to close its contacts and furnish power to vertical winch motor 16 of Fig. 10.

The winch motor continues to operate until carriage 7 reaches a position such that it opens lower limit switch 96, thus opening the power circuit for contactor 146 and stopping the motor. Relays 152 and 153 are correspondingly de-energized through opening of the power limit switch.

*Conveyor drive apparatus*

The apparatus is now ready to begin depositing brick on the empty car, but the infeeding conveyor 3 and the conveyor 9 must first be operated. The infeeding conveyor is driven by a drive motor 160, Fig. 10, while, as above explained, the conveyor 9 is driven by a drive motor 9'. One side of the single phase drive motor 160 is connected to ground lead 132, while the other side thereof is connected by conductor 161 to a contact of "final" relay 162 normally made with swinger 162a of the relay. Relay 162 is normally actuated only when the apparatus has finished a stacking operation, so that it is in its open position at this time. Swinger 162a is connected to lead 163 of Fig. 10 which is connected in Fig. 9 to a contact of relay 164 which is normally contacted by the swinger 164a of the relay. Swinger 164a is connected to lead 131, thus furnishing 110 volts A.-C. to the motor 160 to operate it. The function of relay 164 will be described hereinafter. Suffice it to say that the relay is normally not operated, so that the drive motor 160 begins operation to drive conveyor 3 and provide bricks to conveyor 9.

Single phase drive motor 9' has one side of its operating winding connected to ground lead 132, while the other side of the winding is connected through conductor 165 to a contact of final relay 162 which is normally made with swinger 162b. Since the final relay is not energized at this time, the circuit to the conveyor drive motor 9' is complete through the final relay. Swinger 162b is connected to lead 130 which furnishes 110 volts A.-C. to drive motor 9'. Consequently, the conveyor 9 begins operation to convey brick to the stacking apparatus of the machine.

Since the drive motor 31 is continuously operated to drive the conveyor 24 on support 23, the apparatus is ready to being picking up brick to stack it on the car.

*Brick pickup apparatus*

In order that brick may be picked up by the conveyor 24, it is necessary that pickup solenoid actuator 76 be actuated. As shown in Fig. 10, solenoid 76 has its operating coil connected at one side directly to conductor 132, the ground lead, while its other side is connected by conductor 170 to swinger 162c of final relay 162. Since relay 162 is de-energized at this moment, contact is made through the relay from swinger 162c to conductor 171 which is connected to a normally open contact of a relay 172 which is the pickup relay to control the article carriers. When relay 172 is energized, swinger 172a makes contact with the contact of the relay connected to lead 171, and the swinger is connected to lead 173. Lead 173 in Fig. 9 is connected to a normally closed contact of relay 174. The corresponding swinger 174a of the relay is connected to lead 131, which furnishes 110 volts A.-C. to the pickup relay 76. Relay 174 is an advance relay whose function will hereinafter be described. However, when the stacking operation is first begun, the relay is not actuated, so that the circuit to the pickup electromagnet is complete through the relay.

In order to energize the pickup electromagnet, it remains to energize relay 172 of Fig. 10. The operating coil of that relay has one of its terminals connected directly to lead 123, which supplies 30 volts above ground to the relay. The other side of the operating coil of the relay is connected by conductor 175 to switch 89. As explained above, switch 89 senses the presence of a brick on conveyor 9, as does switch 90, and the two switches are both closed by presence of a brick at the proper position on conveyor 9. When closed, switch 89 connects lead 175 to lead 176 which is connected to normally open limit switch 91. As explained above, limit switch 91 is closed only when the brick is in proper position for the article handling device, so that the prongs 59 of the pickup or article carrier are aligned with the holes of the brick. When the brick is in proper position, switch 91 connects lead 176 to lead 177 which in turn is connected to switch 90. When switch 90 is operated by presence of a brick, lead 177 is connected to lead 134, the grounded power connector. Thus, relay 172 is energized when all of switches 89, 90 and 91 are operated by proper positioning of a brick on conveyor 9. Pickup solenoid 76 is thus operated to force prongs 59 into holes in the brick and pick up the brick.

Conveyor 24 on support 23 now carries the brick along run B of the carriage. As soon as it clears the switches 89—91, the switches are opened and the pickup relay 172 de-energized to open pickup solenoid 76. When the next brick is in proper position to be picked up, the pickup relay is again energized and solenoid 76 operated. The result of this sequence is that a continuous run of bricks is picked up and caused to travel down run B of the carriage.

*Brick deposit apparatus*

As the lead brick 1 progresses along run B, as shown in Fig. 11, it contacts switches 92 in sequence, closing each switch as it passes.

As explained above, the function of deposit switches 92, when they are closed, is to actuate the corresponding discharge solenoids 80. One side of each of deposit switches 92 along run B of the conveyor is connected to a common lead 180 which is connected in Fig. 11 to a normally open contact of transfer relay 181. The function of relay 181 will be described hereinafter. However, transfer relay 181 is not energized at the beginning of the stacking operation, so that the switches 92 along run B of the carriage are not operative when stacking begins.

In like manner, one side of each of relays 80 positioned along run B is connected to a common lead 183 which is also connected to a normally open contact of relay 181. Thus, until transfer relay 181 is operated, the kick-off solenoids along run B will not be operated.

Along run A, one side of each of switches 92 is connected to a common lead 184 which is connected to a normally closed contact of transfer relay 181, this contact being connected through corresponding swinger 181a to a lead 185. Lead 185 is connected to the series combination of all the normally closed contacts 80' of the solenoids 80. Since none of these solenoids is actuated at the beginning of the stacking operation, lead 185 is connected to ground lead 134.

The sides of deposit switches 92a through 92d along run A are connected consecutively to terminals 186a through 186d of the step switch 186. Step switch 186 includes, in addition to its stationary contacts, a swinger 187 adapted to make contact with each of the stationary contacts in turn as the switch is stepped up or advanced. Mounted on the shaft which carries the swinger is a ratchet wheel 188, and a coiled spring 189 urges the wheel and swinger to their initial positions shown in Fig. 11. The step switch also includes an advance solenoid 186' which controls the position of a plunger 190, the plunger carrying a pawl 191 restrained to its position as shown by a spring 192. A stop lever 193 controlled by the plunger 194 of release solenoid 186" and restrained in the position shown by a spring 195, is also provided.

The step switch operates in the following manner: With the switch in the initial position shown, when the advance solenoid 186' is energized, pawl 191 is drawn upwardly and, when the solenoid is released, the pawl is drawn downwardly by spring 192 and advances the ratchet wheel 188 and swinger 187 one step, against the tension of spring 189, where the swinger is held by stop lever 193. During each release of advance solenoid 186' following its energization, the step switch is advanced another step to contact the next sequential stationary contact. When release solenoid 186" is energized, stop lever 193 is withdrawn from the ratchet wheel and spring 189 returns the swinger to its initial position. Spring 195 returns the stop lever to its operative position when the release solenoid is released.

The swinger 187 of the step switch 186, which initially makes contact with contact 186a, is connected by lead 196 to the swinger 197a of a relay 197. The function of relay 197 will be explained hereinafter. Swinger 197a is normally made with a contact which is connected to one side of the coil of a kick-off relay 198. The other contact of relay 197, which the swinger touches when the relay is actuated, is connected to ground lead 134. Kick-off relay 198 is employed to control the kick-off solenoids 80 to complete a circuit to operate the solenoids whenever a brick is to be deposited on a car. Since, as explained above, the common sides of switches 92a—92d are connected to ground, ground is therefore placed on said one side of the coil of relay 198 whenever the one of the switches 92a—92d is operated which is connected to the relay coil through step switch 186. The other side of the operating coil of kick-off relay 198 is connected directly to conductor 133 which is 30 volts hot with respect to ground. Consequently, the relay is operated according to operation of the one of switches 92a—92d correlated with the position of the swinger of step switch 186.

As shown in the drawings, the apparatus is just beginning its stacking operation, so that when a brick reaches switch 92a and closes it, relay 198 is operated to close its swingers upon its normally open contacts. This operation completes a circuit to kick-off solenoid 80a, as will now be explained. One side of each of solenoids 80a through 80d is connected to a common lead 199, and this lead is connected through swinger 181b of transfer relay 181, which is normally touching this contact, to lead 131 which is 110 volts above ground. The opposite sides of solenoids 80a through 80d are connected consecutively to contacts 200a through 200d of a step switch 200. Step switch 200 is constructed in the same manner as step switch 186, so that its specifics will not be described more fully here.

Swinger 201 of the step switch contacts contact 200a at the beginning of the stacking operation, and the swinger consequently connects lead 202 to one side of solenoid 80a at this time. Lead 202, connected to swinger 201, is connected to a normally open contact of kick-off relay 198. The corresponding swinger 198a of the relay is connected to lead 132 which supplies ground to the solenoid 80a. Consequently, when switch 92a is closed by arrival of the first brick at the point opposite kick-off solenoid 80a, kick-off relay 198 is operated and solenoid 80a is correspondingly operated to kick the brick off the conveyor.

Advance coils 186' and 200' of the corresponding step switches are connected in parallel by leads 205 and 206. Lead 206 is connected to lead 133 which is 30 volts hot with respect to ground. Lead 205 is connected to swinger 198b of kick-off relay 198. When relay 198 is not energized, swinger 198b does not make contact, but when the relay is energized, swinger 198b makes contact with a contact connected to lead 185. Lead 185 is connected through the series combination of the normally-closed contacts 80' of each of the kick-off solenoids 80 to lead 134 which is grounded. Thus, every time that kick-off relay 198 is actuated, advance solenoids 186' and 200' are actuated. The circuits to these solenoids are broken when the actuator of the kick-off solenoid which has been operated reaches its innermost position opening the corresponding switch 80'. When the advance solenoids are released, they advance the swingers of the step switches forward one contact or one step.

Relay 197 has been above referred to as including a swinger 197a which normally connects the swinger of step switch 186 to one side of kick-off relay 198. Relay 197 is provided for the purpose of insuring that kick-off relay 198 receives only one actuating pulse at a time and it has one of its coil leads connected to 30 volts hot lead 133. The other side of the coil of the relay 197 is connected to a swinger 198c of relay 198 which, when the relay is actuated, connects the other side of relay 197 to the corresponding side of relay 198. Consequently, after relay 198 is energized, relay 197 is energized to open the circuit between the swinger of step switch 186 and relay 198. This will prevent relay 198 from being pulsed again through the circuit including the step switch, but as soon as relay 198 is energized, it establishes a holding circuit for itself through swinger 198d which connects, when the relay is energized, to lead 185. As above explained, lead 185 is connected through the normally closed contacts of the kick-off solenoids to ground. Relay 197 has a capacitor 208 connected across its actuating coil, whose purpose is to keep relay 197 energized for a period of time following de-energization of relay 198. The actuating circuit for the relay is opened when any switch 80′ is opened at the end of the travel of a plunger 86 of a solenoid 80.

When one brick has been deposited on the car, the kick-off solenoid and kick-off relay return to their unoperated condition, and step-up switches 186 and 200 are advanced to their second positions. The second brick to arrive closes switch 92b which is connected to the second contact 186b of step switch 186, thus again closing the circuit to kick-off relay 198 and, through step switch 200 and the now-closed contacts of kick-off relay 198, energizing kick-off solenoid 80b. When the brick is deposited on the car by the action of kick-off solenoid 80b, the circuit to kick-off relay 198 is once more opened, and the step switches 186 and 200 are again advanced.

The above action repeats itself until the fourth brick is deposited through closure of deposit switch 92d, and actuation of kick-off solenoid 80d. When kick-off solenoid 80d opens its normally closed switch 80′, the step-up relays of step switches 186 and 200 are again de-energized to cause the switches to advance to the fifth contacts thereof. The release solenoids 186″ and 200″ of the step switches are then operated to return the switches to their initial positions. The two solenoids are connected in parallel by conductors 206, connected to 30 volts above ground lead 133, and lead 209, connected through normally-closed contacts of transfer relay 181 including swinger 181c to lead 210 which is connected to the fifth terminal 186e of step switch 186. Step switch 186 at that time has its swinger 187 contacting terminal 186e, so that the connection goes through lead 196 and the normally open but now closed contacts of relay 197 to ground lead 134. Capacitor 208 keeps relay 197 operated long enough after release of relay 198 and advance of step switch 186 to permit this. Consequently, both of the release solenoids are operated when the step switches reach their fifth position, to return the step switches 186 and 200 to their original positions.

The number of rows of brick deposited by the apparatus is counted through a row-counting step switch 215 shown at the left in Fig. 9. Step switch 215 is identical to the other step switches and has an advance solenoid 215′ one of whose leads is connected to 30 volts above ground conductor 133, and its other lead connected to a conductor 216 which, in Fig. 11, is connected to swinger 181c of transfer relay 181. When the transfer relay is in the position shown, swinger 181c is connected to lead 210, which, as explained above in connection with the release solenoids 186″ and 200″, is connected to ground through relay 197 and step switch 186. Thus, when the fourth brick of each row is deposited on the car, the advance solenoid 215′ of row counter step switch 215 is energized and, when relay 197 is released, the advance solenoid is released, to advance step switch 215. Row counting step switch 215 is used to stop the stacking operation when the number of rows desired has been stacked on the car, as will be explained hereinafter.

*Depositing conveyor movement between rows*

At the end of deposit of the first row of bricks, the conveyor 25 must be moved to the right of Fig. 11, as explained above. A relay 220 controls this movement and has its first three swingers 220a through 220c connected through normally closed contact 145f of vertical solenoid contactor 145 to 110 volts lead 130. The latter two of the swingers are connected, when the relay is energized, to leads A and B of a cable 221 which is connected to the apparatus of Fig. 10. Lead A of the cable is connected to one side of the electromagnet of solenoid actuator 55 of clutch 51. The other side of the electromagnet is connected to ground lead 132.

Lead B of cable 221 is connected to one side of brake electromagnet or solenoid 104, and the other side of the brake magnet is connected to ground lead 132. Consequently, when relay 220 is energized, both magnets 55 and 104 are operated. As above explained, actuation of magnet 55 causes movement of the carriage to the right of Fig. 11, while actuation of electromagnet 104 releases the brake which would prevent such movement. The movement to the right of the carriage continues until relay 220 is opened.

One side of the operating coil of relay 220 is connected to 30 volts hot lead 133, while the other side is connected by lead 222 to a contact of a transfer relay 223 connected to swinger 223e when the relay is not energized. The transfer relay operates similarly to transfer relay 181 to prepare the apparatus for depositing the even-numbered layers of bricks. It is not operated when the first layer is being deposited, so that lead 222 is connected through swinger 223e to lead 224 which is connected to the ground side of the advance solenoid 215′ of row-counting step switch 215. As above explained, this side of the advance solenoid is grounded when the fourth or last brick of each row is being deposited, so that relay 220 is energized to cause the depositing conveyor to move to the right at the end of each row of bricks. Relay 220 establishes a holding circuit for itself through its swinger 220d and lead C of cable 221. Lead C of the cable is connected in Fig. 10 to limit switch 98. The limit switch 98 has its other side connected to lead D of cable 221 which is connected in Fig. 9 to ground lead 134. Thus, once the relay 220 is energized, it remains energized until roller 99 drops into the next slot of track 97, whereupon the relay de-energizes and the brake electromagnet 104 operates to stop movement of the support and conveyor to the right, and the electromagnetic actuator 55 correspondingly releases.

The depositing conveyor 24 now has moved to the right of Fig. 11 to the extent of the desired spacing between the center lines of adjacent rows of bricks. The apparatus will now repeat the operation described above, depositing bricks parallel to the first four bricks, in the second row, then in the third row, and so forth until the desired number of rows is deposited on the car. After each row is completed, the conveyor will move one row to the right, as above explained, and the row counting step switch 215 will advance one step clockwise.

*Preparation of apparatus for depositing second layer*

The apparatus specifically disclosed herein is designed to deposit 28 rows of brick in the first layer along the length of the car. When the 27th row is deposited, and step switch 215 reaches its 28th position, its swinger 225, which is connected to grounded lead 134, contacts a terminal which is connected to a lead 226. Lead 226 applies ground to one side of the advance solenoid 230′ of a layer counting step switch 230. The other side of the coil of solenoid 230' is connected to 110 volts lead 133, so that the solenoid is energized. When solenoid 133' is released by stepping of row counting step switch 215 to its 29th position, the swinger 231 of layer-counting step switch 230 steps to its second position. The swinger of the layer-counting step switch is connected to grounded lead 134, while contact 230b of the switch, corresponding to the second position thereof, is connected to lead 232 which is connected in Fig. 9 to one side of the operating coil of transfer relay 223, and is connected in Fig. 11 to one side of the operating coil of transfer relay 181. The other side of each of the transfer relays is connected to 110 volts lead 133, so that both of the transfer relays are operated when the layer-counting step switch advances to its second position. It will be noted that all the even-numbered contacts of step switch 230, corresponding to its even-numbered positions, are connected to lead 232, so that the transfer-relays are energized at the end of each odd-numbered layer.

Operation of the two transfer relays readies the system to deposit brick all along the length of course B of the carriage, but it is first necessary to re-position the carriage by raising it and returning it to its proper position in the horizontal plane.

As was indicated above, when row-counting step switch 215 moves from position 28 to position 29, signalling the end of the 28 rows of the initial layer, it causes de-actuation of the advance solenoid 230' of the step switch 230. At the same time, this movement of the row counting step switch causes actuation of release solenoid 215" of the step switch to return the step switch to its initial position, and actuation of a relay 240 which controls the upward movement of the vertical adjustment motor, through lead 241. One side of the operating coil of relay 240 and one side of release solenoid 215" are connected to 30 volts above ground lead 230', while the opposite sides of the coils are connected through the row-counting step switch 215 to ground lead 134. Relay 240 has a swinger 240a which is connected to one side of the normally open contacts 145e of solenoid actuator 145, while the corresponding contact of the relay, when it is energized, is connected to the other side of these contacts. As pointed out above in conjunction with initial positioning of the carriage for stacking brick on the car, one side of solenoid actuator 145 is connected to 110 volts lead 131. The other side of the solenoid is connected through the contacts of relay 240 to lead E of cable 142, which, in Fig. 10, is connected to elevation limit switch 93. The limit switch 93 is closed at this time and connects lead E to lead F in cable 142, which latter lead in Fig. 9 is connected to 110 volts lead 130. Solenoid actuator 145 is correspondingly energized. Operation of the solenoid contactor furnishes potential on leads A through D of cable 142, as explained above, to operate vertical winch motor 16 in a direction to move the depositing conveyor upwardly. The conveyor moves upwardly until switch 93 is opened by movement of roller 94 into one of the notches on track 95. This opens actuator 145 and stops the winch motor. The spacing of the notches on track 95 is sufficient that the carriage is moved upwardly by one layer of bricks from its position for the initial layer deposited on the car.

When relay 240 operates, it closes its swinger 240b, which is connected to grounded lead 134 to a lead 250 which is connected to swinger 223c of transfer relay 223. The corresponding contact of relay 223 when the relay is open, is connected by lead 251 to one side of an actuating relay 252 for the horizontal motor contactor. The other side of relay 252 is connected to 30 volts lead 133, so that relay 252 is energized when relay 240 is operated and before relay 223 is energized. Relay 240 is not energized immediately upon operation of the advance solenoid 230' of layer-counting step switch 230, because a capacitor 255 is connected across the terminals of that solenoid and prevents its release for some period after row-counting step switch 215 moves to position 29. Another relay 260 is also energized at this time. This relay controls the horizontal positioning of the carriage, operating when it is energized to cause the carriage to move to the left of Fig. 11. The relay has one of the terminals of its coil connected to lead 251, while its other terminal is connected to lead C of a cable 261. Lead C of cable 261 is connected in Fig. 10 to one side of transverse course limit switch 100, which, at this time, is closed. The other side of the switch is connected to lead D of the cable which, in Fig. 9, is connected to 30 volts lead 134. Consequently, relay 260 is operated when relay 252 is operated. Relay 260 establishes a holding circuit for itself and for relay 252 by closure of its swinger 260c upon a contact which is connected to ground lead 134.

Swingers 260a and 260b and 252a of these two relays are connected through the normally closed contacts 145f of vertical solenoid contact or 145 to 110 volts lead 130. However, these relays are not effective as long as the vertical winch motor is operated, because normally closed contacts 145f are open at this time. When the vertical positioning is completed, the contacts close, and swingers 260a and 260b place 110 volts on conductors A and B of cable 261. In Fig. 10, these conductors A and B are connected to the electromagnet or solenoid actuator 56 of clutch 52 and brake electromagnet 104, respectively. Operation of the clutch causes the depositing conveyor to be returned to the left of Fig. 11, and the returning operation proceeds until limit switch 100 is opened by abutment 101 at the far lefthand limit of travel of the conveyor. With the opening of switch 100, the circuit to relay 260 is opened, and the relay is de-energized.

Before relay 260 is de-energized, the closure of the circuit including the normally closed contacts 145f of solenoid actuator 145 and the swinger 252a of relay 252 puts 110 volts on a lead 265 connected to one side of a solenoid actuator 270. Solenoid 270 is used to control the horizontal positioning motor 40 to adjust the position of the depositing conveyor away from the operator to transfer between the depositing operation in the first layer and that of the second layer. The other side of the operating coil of actuator 270 is connected to lead E of a cable 271 which, in Fig. 10, is connected to the horizontal winch motor 40.

Horizontal winch motor 40 is of similar construction to vertical winch motor 16 and includes a pair of coils 275 and 276. Coil 276 is connected to leads B and C of cable 271 which, in Fig. 9, are connected in multiple to corresponding contacts of solenoid contactors 270 and 278. Lead B is connected through corresponding contacts of each contactor, when it is operated, to 110 volts lead 131, while lead C is connected through the corresponding contacts of each contactor to 110 volts lead 130. Hence coil 276 receives the same phase voltage, no matter which contactor is energized. Coil 275 is connected to leads A and D of cable 271 which are connected to the corresponding contacts of contactors 270 and 278, but lead A is connected through contactor 270 to lead 130 and through contactor 278 to lead 131, while the opposite connections for lead D are present, so that opposite phase voltages are supplied to coil 275 when the different contactors are energized. The result is that the motor 40 is driven in such direction as to move the depositing conveyor away from the operator (to the right of Fig. 7) when solenoid 270 is energized, while the opposite obtains when solenoid 278 is energized.

Lead E of cable 271 in Fig. 10 is connected through longitudinal course limit switch 106 to lead F of the cable. The limit switch is normally closed. Lead F of cable 271 is connected in Fig. 9 to 110 volts lead 131. The solenoid contactor is thus actuated to close its normally-open contacts. The conveyor is thus moved away from the operator until roller 107 of limit switch 106 fits into a notch in track 105, opening the limit switch, when solenoid actuator 270 opens. The notches in track 105 are so spaced that the conveyor will move away from its initial position to such an extent that it may deposit brick along the length of run B of the conveyor.

The apparatus is now in position to deposit brick along the second layer, that is, perpendicularly to the original rows of brick.

*Depositing in second layer*

As stated above, transfer relays 181 and 223 were operated at the end of the stacking of the first layer of bricks. Actuation of relay 181 switches its several swingers from their original positions to contact the normally open contacts of the relay. Swinger 181b, tied to 110 volts lead 131, now makes contact with a lead 183 which, as explained above, is connected to one side of the operating coils of each of the kick-off solenoids 80 along run B of the conveyor. The other sides of the coils of the kick-off solenoids of this run are connected sequentially to the progressively higher-lettered contacts of step switch 200, beginning with 200a and progressing through 200h.

As indicated above, the various deposit switches 92 extending along run B of the conveyor are each connected together at one of their ends to a common lead 180 which is connected by swinger 181a of the transfer relay 181 to lead 185 when the transfer relay is operated. Also as indicated above, lead 185 is connected through the various normally-closed switches 80' of the kick-off solenoids 80 to ground lead 134. The other sides of the various deposit switches along run B of the conveyor are connected sequentially to progressively higher-lettered contacts of step switch 186, beginning with 186a and progressing through 186h. As indicated before, the swinger 187 of the step switch is connected to lead 196 which in turn is connected through the normally closed contacts of relay 197 to one side of the coil of kick-off relay 198. Also as indicated above, the other side of kick-off relay 198 is connected to 30 volts hot lead 133.

Swinger 181c of the transfer relay 181 has no function when the conveyor is depositing brick along run B.

The apparatus now begins to deposit brick as described before in conjunction with run A of the conveyor. However, instead of passing around to run A, the brick which is picked up through the action of the pick-up circuits, operates to close the kick-off relay 198 when it touches the appropriate deposit switch 92 along run B. For instance, the first brick of the second layer closes deposit switch 92e which closes a 30 volts circuit to the kick-off relay through the deposit switch, the first contact 186a and the swinger of step switch 186, the contacts of relay 197, the coil of the kick-off relay 198, the contacts of transfer relay 181, and the series combination of all of the normally-closed contacts 80' of the kick-off solenoids 80. Operation of the kick-off relay, as described above, causes operation of the corresponding kick-off solenoid to deposit the first brick along the upper left-hand edge of run B, as viewed in Fig. 7d. When the brick is deposited, the solenoid plunger opens the normally-closed contacts of its switch 80', thus opening the circuit to the kick-off relay and opening the kick-off solenoid. Advance solenoids 186' and 200' of the step switches 186 and 200 are energized at the same time as is the kick-off relay, and are opened when the kick-off relay releases, thus causing the corresponding step switches to advance to the second terminals thereof. The next brick that comes along then actuates the next deposit switch and operates the corresponding kick-off solenoid through the same chain of operation.

When the 8th brick has been deposited along run B, swinger 187 of step switch 186 moves to a position contacting terminal 186i which is connected to lead 209. Lead 209 is connected to one side of each of release solenoids 186" and 200", so that these solenoids are actuated to return the step switches to their initial positions. Since the ground side of the advance solenoid 215' of row-counting step switch 215 is also connected to lead 209 through lead 216, the solenoid is operated at the same time as release solenoids 186" and 200" and step switch 215 advances to its second position when the release solenoids are released.

At the same time that advance solenoid 215' is actuated, the away motor solenoid actuator 270 of Fig. 9 is also actuated. This action takes place through operation of relay 252. As above indicated, one side of the operating coil of relay 252 is tied to 30 volts hot lead 133, while the other side is connected to a normally-open lead of transfer relay 223 which is contacted by swinger 223e of the relay when the relay is closed. Swinger 223e is connected to lead 224, in parallel with the advance solenoid 215'.

The coil of solenoid actuator 270 receives its operating potential in the manner above described. When it operates, it closes a circuit to horizontal winch motor, also as above described, to operate the motor to move the depositing conveyor away from the operator until the roller 107 of switch 106 falls into a notch on track 105. The conveyor is then in position to deposit the next row of bricks along run B.

The apparatus now functions as before to deposit the second row of bricks along run B, then the third row, etc., until a number of rows appropriate to the width of the car has been deposited. The row-counting step switch 215 is advanced for each row of brick deposited. In the embodiment described herein, 14 rows are to be deposited along run B.

*Movement of conveyor after second layer*

After the 13th row has been deposited, the slider of step switch 215 moves to touch the 14th terminal of the switch, which is tied to lead 290. Lead 290 is connected through swinger 223a of the transfer relay 223 to lead 226. Lead 226 is the ground lead for advance solenoid 230' of the layer-counting step switch 230. Thus, at the end of the 13th row, the advance solenoid is energized, and, when the 14th row is compelled, and row-counting step switch 215 is advanced to the 15th position, the advance solenoid 230' is released, and the layer-counting step switch advances to the third position. Since the third terminal of the layer-counting step switch is un-connected, the transfer relays 223 and 181, whose energizing circuits are completed through the layer-counting step switch, are de-energized. However, the capacitor 255 across the advance solenoid of layer-counting step switch 230 holds the solenoid actuated long enough so that transfer relay 223 remains energized to complete a circuit to the up motor relay 240. This occurs through lead 241 which is connected to swinger 223b of the transfer relay, the swinger being connected to a lead 296 when the relay is energized, and lead 296 being connected to the 15th terminal of the row-counting step switch. Thus, before transfer relay 223 is de-energized, the row-counting step switch has advanced to its position 15 and provides ground to one side of relay 240. The relay thus energizes and controls the up motor solenoid contactor 145 to cause the depositing conveyor 23 to raise the height of one row of brick, at the end of stacking of the second layer.

As noted above, relay 220, which controls the right movement of the carriage, has one of the sides of its operating coil connected through the now-closed swinger 240b and its associated contact and the still-closed swinger 223c and its associated contact of the transfer relay to ground, so that when relay 240 is energized, relay 220 is also energized. Relay 220 establishes a holding circuit for itself through its swinger 220d and energizes the electromagnetic actuator 55 and brake solenoid 104 of Fig. 10 to cause the depositing conveyor to move to the right until switch 98 is opened by movement of roller 99 into the notch in track 97. The conveyor thus moves one step away from its extreme lefthand position before the relay 220 is de-energized by opening of the switch.

While relay 220 is energized, solenoid contactor 278 is also energized to cause the horizontal motor 40 to move the carriage back toward the operator until switch 108 is opened. One side of the operating coil of solenoid actuator 278 is connected through lead G of cable 271 and horizontal limit switch 108 in Fig. 10 to lead H of the cable which in Fig. 9, is connected to 110 volts lead 131. The other side of the coil is connected to lead 298 which is connected through swinger 220a and its associated contact of relay 220 and the contacts 145f of the vertical solenoid contactor to 110 volts lead 130. The contactor is thereby energized and held by its contacts 278e shunting the relay circuit until the switch 108 is opened. The apparatus is then ready to stack another layer of bricks along run A. This layer will be deposited in the same manner as the first layer so that the operation need not be explained again.

End of stacking operation

As each additional layer is laid down on the car, the layer-counting step switch 230 advances one more position. When the 9th layer has been laid down, the step switch reaches position 10, in which position its swinger is connected to a lead 300 which is connected in Fig. 9 to one side of final relay 162, above described. Operation of final relay 162 causes its swinger 162c to open the circuit to the pick-up solenoid 76, causes its swinger 162b to open the circuit to drive motor 9' for the conveyor 9, causes its swinger 162a to open the circuit to the drive motor 160 for the infeeding conveyor 3, and establishes a holding circuit for itself through its swinger 162d, which is connected through the contacts of the normally energized relay 153 to ground lead 134. The apparatus then stops feeding and stacking brick. The end of the stacking operation is signalled by actuation of an alarm bell 305 which has its operating coil connected at one side by lead 306 to 30 volts lead 133 and its other side connected by lead 307 to swinger 162d of the final relay. As above explained, relay 153 is energized through the contacts of the down limit switch 96, which are closed at the end of a stacking operation because the carriage has ascended above its lowermost position.

Stopping brick feeding during conveyor movements

It has been explained above that the depositing conveyor of the brick-stacking apparatus moves between depositing individual rows and between depositing individual layers of brick. In order to prevent interference with these movements by the presence of bricks on the conveyor during the movement, controls are provided to stop feeding of brick during these motions.

In order to count the number of bricks picked up from the infeeding conveyor, the apparatus is provided with a step switch 310 in Fig. 9, which step switch is similar to the other step switches previously described, and has a slider 311, as well as an advanced solenoid 310' and a release solenoid 310". The swinger of the step switch is connected to ground lead 134, while the 5th and 9th terminals of the switch are connected respectively to leads 312 and 313. Lead 312 is connected to a contact of transfer relay 223 which is touched by swinger 223d thereof when the relay is not operated. This of course occurs when the apparatus is depositing the odd layers of brick. Swinger 223d of the transfer relay is connected to lead 313, and lead 313 is connected to one side of the operating coil of relay 174, above referred to. As explained above, the other side of relay 174 is connected to 30 volts hot lead 133. Thus, when the brick-counting step switch 310 reaches its 5th and 9th positions, relay 174 is energized. As explained above in connection with depositing the first layer of bricks, the first swinger 174a of relay 174 connects the pick-up solenoid 76 to ground when the relay is not operated. Consequently, when relay 174 is operated by the pick-up of the 4th or 8th bricks, depending upon the position of transfer relay 223, the actuating circuit for the pick-up solenoid is opened, so that the apparatus cannot pick up any more brick until the step switch 310 is moved to its next position. The actuating coil of the advance solenoid 310' of the step switch has one of its sides connected to 30 volts hot lead 133, and its other side connected to conductor 175. Lead 175 in Fig. 10, as explained above in connection with the pick-up operation, is connected to ground lead 134 through position switches 89, 90 and 91. Thus, every time a brick operates these three switches, the advance solenoid of the step switch 310 is actuated, and when the switches are opened, the step switch moves to its next position. As a result, when the 4th brick is ready to be picked up, step switch 310 moves into its 5th position, while when the 8th brick is ready to be picked up, the step switch moves into its 9th position.

The reset solenoid 310" of the step switch has one of its terminals of its actuating coil connected to 30 volts hot lead 133, while its other terminal is connected to lead 316. Lead 316 is connected to a swinger 317a of a relay 317. When relay 317 is actuated, the circuit to the reset solenoid of the step switch is open at the relay, but when the relay is not actuated, swinger 317a is connected to ground lead 314 through the relay contacts. The operating coil of relay 317 has one of its terminals connected through the normally-closed contacts 270f of away motor actuator 270 to a lead 318. Lead 318 is connected to lead C of cable 221 which is connected in Fig. 10 to the transverse course limit switch 98. The other terminal of the limit switch is connected to ground lead 134. Thus, relay 317 is normally operated to open the circuit to the reset solenoid of the step switch, but when the away motor solenoid actuator 270 is operated to open its normally-closed contacts, or when the transverse course limit switch is open, the relay is opened, to provide voltage for operation of the reset solenoid. Further, whenever the away motor solenoid contactor operates the horizontal winch motor 40, the step switch 310 is reset, and whenever the conveyor is moved to the right or to the left to start another row of the stacking operation, the step switch is reset.

The relay 317 also has a swinger 317b which is operative in its actuated position to connect ground from lead 134 to a holding circuit for relay 174. The swinger of relay 317 is connected to a terminal of relay 174 which is normally not connected in circuit. However the swinger 174b of the relay, which is connected to one side of the operating coil thereof, touches this contact when the relay is actuated, and operation of relay 317 while relay 174 is operated to prevent pick-up of bricks keeps relay 174 operated, until the depositing conveyor movement is completed.

The above-described operation is effective during the odd layers to prevent pick-up of bricks when each row of 4 bricks has been completed and the conveyor is moving to ready itself to deposit the next, and it is effective when the apparatus is depositing the even layers of brick and has completed the 8 bricks in a row thereof to prevent pick-up of bricks until the conveyor has moved to its position to deposit the next row. The transfer relay 223, by switching to its operated condition from its unoperated condition when the even layers are about to be deposited, controls when these operations are about to take place, as above described.

I have described how the pick-up operation of bricks is prevented when the depositing conveyor is moving between depositing adjacent rows of bricks, and it remains to describe how the conveying operation is prevented when the conveyor is moving between depositing layers of bricks. To provide for this operation, the apparatus of Fig. 9 is provided with a step switch 320, of form similar to the other step switches described above, and which has a swinger 321, an advance solenoid 320', and a release solenoid 320". The only stationary contact of the step switch that is connected has its terminal connected to a lead 321 which is connected to a normally open contact of a relay 322. The operation of relay 322 will be subsequently explained. The advance solenoid 320' has one of its terminals connected to 30 volts hot lead 133, while its other terminal is connected to lead 324. Lead 324 is connected in Fig. 10 to the normally-closed contacts of a relay 325. The associated swinger 325c of the relay is connected to ground lead 134.

Relay 325 is controlled by a photo-electric circuit including a source of illumination 326, a photo-electric cell 327, and a conducting circuit including pentode tube 328. The system is aligned to be sensitive to feed of bricks on the conveyor 3 and operates to provide a negative pulse to tube 328 whenever a brick passes the beam of light from source 326. This negative pulse cuts the plate current of the tube to such an extent that relay 325, which is normally operated by the usual plate current of the tube, opens, thus closing the circuit to the advance solenoid of the step switch 320. The step switch thus counts the number of bricks being fed by the conveyor 3 to conveyor 9. The release solenoid 320" has one of its terminals connected to 30 volts hot lead 133, while its other terminal is connected to the 9th terminal of the step switch, so that the solenoid is actuated whenever 8 bricks are counted by the step switch. When the 8th brick passes, the release or return solenoid 320" operates, and the step switch returns to its initial position.

In order for the step switch 320 to have any effect on the system, relay 322 must be operated. The coil of this relay has one of its terminals connected to 30 volts hot lead 133, while its other terminal is connected to swinger 233a of the transfer relay 223. As above explained, this swinger is also connected to lead 226, which is connected to the 28th terminal of the row-counting step switch 215. Also as above explained, swinger 223a is connected, when the transfer relay is operated during deposit of the even layers of bricks, to terminal 14 of the row-counting step switch. Since the swinger of the row-counting step switch is connected to ground lead 134, when the allotted number of rows are deposited by the apparatus (28 during the odd layers and 14 during the even layers) ground is applied to the coil of relay 322 to operate the relay. The swinger 322a of the relay is connected to one side of the coil of adjacent relay 164, while the other side of the coil is connected to 30 volts hot lead 133. Thus, whenever 8 bricks have been fed past the photo-electric system of the infeeding conveyors, and 28 (or 14) rows of brick have been deposited on the car, relay 164 is energized. As above explained, the swinger 164a of relay 164, when the relay is not energized, completes the circuit for infeeding conveyor drive motor 160, through lead 163, and final relay 162. Thus, when the last row of a layer has been deposited, the circuit to the conveyor drive motor is opened, and the infeeding conveyor stopped. The swinger 164b of relay 164 establishes a holding circuit for the relay, the swinger being connected to one side of the relay coil, and the associated contact being connected to lead 330. Lead 330 of Fig. 10 is connected to a terminal of a relay 331 which is normally contacted by swinger 331a of the relay. Swinger 331a is connected to ground lead 134. Relay 331 has one side of its operating coil connected to ground lead 132, while its other side is connected to lead 332. Lead 332 in Fig. 9 is connected to lead G of cable 271. In Fig. 10, lead G is connected to the longitudinal course limit switch 108 of the horizontal winch motor 40. When the switch is closed, lead G is connected to lead H of cable 271 which is connected to 110 volts lead 131. Consequently, relay 164 has its holding circuit normally completed through the relay 331, but the holding circuit is interrupted when the depositing conveyor moves to open the longitudinal course limit switch 108.

The apparatus of the preferred embodiment of the invention has now been fully described. The operation of the apparatus has been discussed during description of the apparatus itself, so that a short statement of the operation in stacking will suffice to make the operation clear.

Operation

When a stacking operation is to begin, a new car must be on the tracks and must be unloaded. The start switch 125 of Fig. 10 is then actuated to provide power for the various components of the system. The down switch 151 is then actuated to move the depositing conveyor 24 down to its position for depositing the first layer of bricks. Then, as the first 4 bricks are fed by the conveyors 3 and 9, they are individually picked up by the depositing conveyor and carried along run B thereof. The next brick remains on conveyor 9 and is not picked up until the first row of bricks has been deposited. The first 4 bricks are led around the support 23 until they reach run A and are deposited in line along run A. The support and conveyor are then moved to the right of the operator by one notch of track 97 in Fig. 10, a spacing equivalent to the spacing between rows of the bricks. The next 4 bricks are then picked up in turn by the depositing conveyor and are deposited parallel to the first row. The support and conveyor move again, and the depositing and moving operations repeat themselves until the allotted number of rows has been deposited, 28 rows in the illustrated embodiment. The infeeding conveyors 3 and 9 are then stopped, and the support 23 and conveyor 24 are moved upwardly by the vertical winch motor 16 by the distance of one notch of track 95 of Fig. 10. The support is then moved to the left in Fig. 11 over to the end of its travel in this direction, and the support is moved away from the operator by one notch of track 105 of Fig. 10, the distance corresponding to the thickness of the bricks. The apparatus is now ready for depositing the second layer of bricks, and transfer relays 181 and 223 are operated to adjust the apparatus for depositing in a direction perpendicular to the original depositing operation. The infeeding conveyor motors are again operated, and the first 8 bricks provided by the conveyor are picked up in turn by the depositing conveyor and advanced along run B, where they are deposited in turn along the length of that run by the kick-off solenoids. After the 8th brick is picked up, the pick-up solenoid circuit is opened, so that no more brick may be picked up. After the 8th brick is deposited, the apparatus functions to move the support away from the operator by one notch of track 105, through horizontal winch motor 40. The next 8 bricks then are picked up and deposited parallel to the first row of bricks, and the operation repeats itself until the allotted number of rows on the second layer are completed, in the illustrated embodiment, 14. The pick-up and feeding operation is again stopped, the support is moved up one notch of track 95 of Fig. 6 by the vertical winch motor, the carriage is moved to the left of Fig. 7 until it reaches its proper position for stacking along run A, and the support is moved toward the operator by horizontal winch motor 40 until it reaches the end of its travel in this direction. The apparatus is then ready to stack the 3rd layer of bricks.

When the allotted number of layers has been stacked by repetition of the previously-described operations, in the illustrated embodiment 9 layers, final relay 162 of Fig. 10 is operated to open the circuits to the various drive motors to prevent supply of any further bricks, and the alarm bell 305 is actuated to signal the end of the stacking operation.

The apparatus of the present invention has been described in conjunction with a preferred embodiment thereof. It will be understood that many minor modifications could be made in the apparatus without departure from the scope of the invention. For instance, the electrical operating circuits of the carriage control apparatus could be modified in many respects. Consequently, it is to be understood that the invention is not limited to the described embodiments, but is only limited by the appended claims.

I claim:

1. In an apparatus for stacking articles on an article receiver, the combination of means for supporting the article receiver; an endless depositing conveyor arranged above said supporting means and including two straight line portions extending horizontally substantially at right angles to each other, said conveyor being mounted for horizontal movement in the directions of said straight line portions, said supporting means and said depositing conveyor being arranged for relative vertical movement; an infeeding conveyor disposed to supply articles in sequence to said depositing conveyor; means associated with said depositing conveyor to control the same for deposition of a series of rows of articles parallel to one of said straight line portions; means responsive to deposition of a predetermined number of such rows for increasing the vertical spacing between said depositing conveyor and said supporting means to accommodate additional rows of articles, and means responsive to such increase to control said depositing conveyor for deposition of a series of rows of articles parallel to the other of said straight line portions.

2. In an apparatus for stacking articles on an article receiver, the combination of means for supporting the receiver; an endless depositing conveyor positioned above said supporting means and including two horizontally extending straight line portions disposed substantially at right angles to each other; means mounting said depositing conveyor for horizontal movement in the directions of said straight line portions, said supporting means and the mounting means for said depositing conveyor being constructed to allow relative vertical movement between said supporting means and said conveyor; an infeeding conveyor arranged to supply articles successively to said depositing conveyor; control means associated with said depositing conveyor for causing the same to deposit the articles sequentially to form a straight line row as they are conveyed along one of said straight line portions; actuating means associated with said mounting means for adjusting the depositing conveyor stepwise in said directions of horizontal movement; control means associated with said actuating means for causing the same to effect one such horizontal adjustment automatically upon deposition of each straight line row of articles; means responsive to deposition of a predetermined number of such rows of articles for relatively vertically adjusting said depositing conveyor and said supporting means to provide space for additional rows of articles, and means operable after such vertical adjustment for controlling said depositing conveyor to deposit additional rows of articles in the direction of the other of said straight line portions.

3. In an apparatus for stacking articles on an article receiver, the combination of an endless depositing conveyor including two straight line portions arranged at an angle to each other, a frame, positioning means for said article receiver, means mounting said conveyor on said frame for vertical movement above said positioning means with said straight line portions disposed horizontally, selectively operable means for effecting relative horizontal stepwise movement between said conveyor and said positioning means in the directions of said straight line portions, said conveyor including a plurality of article carriers spaced therealong and actuatable to release articles for deposit, and means associated with said conveyor for actuating said carriers only while said carriers travel one of said straight line portions to deposit articles in sequence to form rows of articles parallel to said straight line portions.

4. In an article stacking machine, the combination of an endless depositing conveyor including two straight line portions arranged at an angle to each other, frame means, carriage means movably mounted on said frame means for vertical adjustment relative thereto, means mounting said depositing conveyor on said carriage means for horizontal adjustment in the directions of said straight line portions and with said straight line portions disposed horizontally, an infeeding conveyor disposed to feed articles to said depositing conveyor, said depositing conveyor including a plurality of article carrying means constructed to engage articles as they are delivered by said infeeding conveyor and actuatable to deposit such articles at will, control means operatively associated with said depositing conveyor to actuate said article carrying means to deposit such articles in sequence only when such article carrying means travel said straight line portions, and selectively operable means associated with said depositing conveyor for imparting stepwise horizontal movement thereto in the directions of said straight line portions.

5. In an article stacking machine of the type described, the combination of a frame, a horizontally disposed endless depositing conveyor having two straight line portions arranged at an angle to each other, said conveyor including a plurality of article carriers spaced therealong and actuatable to deposit the articles carried thereby, means mounting said conveyor on said frame for vertical movement and for horizontal movement in two directions each parallel to a different one of said straight line portions, means for feeding articles in succession to said conveyor, means for driving said conveyor, means responsive to appearance of an article at a predetermined point along one of said straight line portions for actuating said carriers to deposit articles in series to form a row along said one straight line portion, means responsive to completion of a row for adjusting the conveyor horizontally stepwise in the direction of the other of said straight line portions, and means responsive to completion of a plurality of such rows to adjust said conveyor upwardly to make room for another layer of articles.

6. In an article stacking machine of the type described, the combination of a frame, a carriage, means mounting said carriage on said frame for vertical adjustment, an endless depositing conveyor disposed in a horizontal plane below said carriage and including two straight line portions arranged at an angle to each other, means mounting said depositing conveyor on said carriage for horizontal adjustment in the directions of said straight line portions, said depositing conveyor including a plurality of article carriers spaced therealong and actuatable to deposit articles at will, means for feeding articles to said depositing conveyor in sequence for engagement by said carriers, control means operatively associated with said depositing conveyor to cause said carrier to deposit articles in sequence to form a row along one of said straight line portions, adjusting means operatively associated with said depositing conveyor to move the same horizontally in the direction of the other of said straight line portions when said depositing conveyor has deposited a row along said one straight line portion, and adjusting means for moving said carriage upwardly when said depositing conveyor has deposited a plurality of such rows.

7. In a machine for stacking articles in a plurality of layers consisting of parallel rows with the rows in adjacent layers being at an angle to each other, the combination of a frame, an endless depositing conveyor including two straight line portions arranged at an angle to each other, means mounting said conveyor on said frame for vertical movement and for horizontal movement in the directions of said straight line portions with said straight line portions maintained in a horizontal plane, said depositing conveyor including a plurality of article carriers spaced therealong and actuatable to release articles for deposit, actuating means for causing such carriers to effect such deposit only while the carriers travel one of said straight line portions, control means responsive to arrival of an article at a given point on one of said straight line portions for causing said actuating means to sequentially actuate said carriers for deposit of a row of articles along said one straight line portion, and means responsive to deposit of a predetermined number of articles in such row for adjusting said conveyor horizontally in the direction of said other straight line portion preparatory to deposit of another such row of articles parallel to the first.

8. In combination in an article stacking machine of the type described, a frame, a main carriage mounted on said frame for vertical movement relative thereto, an intermediate carriage, means mounting said intermediate carriage on said main carriage for movement along a horizontal line, an endless depositing conveyor having two straight line portions at an angle to each other, and means mounting said depositing conveyor below said intermediate carriage for movement along another horizontal line with said straight line portions of said depositing conveyor maintained in a horizontal plane, the straight line portions of said depositing conveyor being each parallel to one of said lines of horizontal movement.

9. In a machine for stacking articles in a plurality of layers consisting of parallel rows with the rows in adjacent layers being at an angle to each other, the combination of a frame, an endless depositing conveyor disposed in a horizontal plane and including two straight line portions arranged at an angle to each other, said conveyor including a plurality of article carriers spaced therealong and actuatable to release articles for deposit, means mounting said conveyor on said frame for vertical movement and for horizontal movement in the directions of said straight line portions, actuating means for causing said carriers to release articles only while the carriers travel one of said straight line portions, control means for said actuating means responsive to arrival of an article at a given point on one of said straight line portions for causing said actuating means to actuate a predetermined number of said carriers sequentially to deposit a row of articles along said one straight line portion, adjusting means responsive to completion of such row for adjusting said conveyor horizontally in the direction of said other straight line portion preparatory to deposit of another row, row counting means, means controlled by said row counting means for elevating said conveyor upon completion of the last of a predetermined number of rows of articles preparatory to deposit of a second layer of articles, and additional control means, adjusting means and row counting means associated with said conveyors for effecting deposit of rows of articles along said other straight line portion to form such second layer.

10. In an article stacking machine of the type described, the combination of a frame, a support including a horizontally disposed member having two straight sides intersecting at an angle, an endless depositing conveyor mounted on said support and extending therearound so as to traverse said straight sides, said conveyor including a plurality of article carriers spaced therealong and actuatable to release articles for deposit, means mounting said support on said frame for vertical movement and for horizontal movement in the directions of said straight sides, actuating means carried by said support at spaced points along said sides and disposed to actuate said carriers when the carriers and actuating means are aligned, control means responsive to the arrival of an article at the last of said actuating means on one of said sides to operate said actuating means in sequence for deposit of a row of articles parallel to said one side, adjusting means responsive to completion of such row for adjusting said support horizontally in the direction of the other of said sides preparatory to deposit of a second row, row-counting means, means controlled by said row-counting means and operatively connected to said support to elevate the same upon completion of a predetermined number of rows of articles preparatory to deposit of a second layer of articles, and additional control means, adjusting means and row-counting means associated with said conveyor for effecting deposit of rows of articles along said other straight line portion to form such second layer.

11. In an article stacking machine, the combination of an endless depositing conveyor including two substantially rectilinear portions arranged at an angle to each other, means for driving said conveyor, frame means, means mounting said depositing conveyor on said frame means for horizontal movement thereof in the directions of at least one of said rectilinear portions, an infeeding conveyor for delivering articles to said depositing conveyor, said depositing conveyor including a plurality of article carriers arranged thereon to travel along said rectilinear portions, means for operating said carriers individually as they pass said infeeding conveyor to cause them to pick up said articles therefrom so they may be carried along said rectilinear portions, means for releasing said carriers sequentially along said other rectilinear portion to deposit a row of a predetermined number of articles therealong, means for moving said depositing conveyor along said one rectilinear portion a distance sufficient to allow deposit of another row alongside the last row, means controlled by completion of depositing of a row of articles for operating said moving means, and means for disabling said operating means to prevent articles from being picked up from the time sufficient articles have been picked up to form a row until after the conveyor has completed its movement.

12. Apparatus as defined in claim 11 including means for disabling said conveyor driving means, said moving means and said operating means after a predetermined number of rows of articles have been deposited by said depositing conveyor.

13. Apparatus as defined in claim 11 in which said articles carriers each includes a device pivoted to said depositing conveyor and movable in one direction to pick up an article and in the other direction to release an article.

14. Apparatus as defined in claim 13 in which said depositing conveyor includes an endless chain and said devices each includes means for compensating for movement of the device between said rectilinear portions of the conveyor.

15. Apparatus as defined in claim 11 in which said releasing means includes a plurality of switches equally spaced along said other rectilinear portion of the depositing conveyor and in position to be contacted and operated by said articles as they pass by, and means mounted adjacent each switch to release the adjacent carrier.

16. Apparatus is defined in claim 11 in which said operating means includes switch means in the path of movement of said articles closed thereby only when the articles are in proper position to be picked up and switch means positioned to be closed by said carriers only when the carriers are in proper positions to pick up articles, and means responsive to closure of both said switch means for moving the adjacent carrier to a position to pick up the adjacent article.

17. In an apparatus for stacking articles on an article receiver, the combination of frame means, means for positioning the article receiver below said frame means; an endless depositing conveyor mounted on said frame means above the position of the article receiver and including two horizontally extending straight line portions disposed at right angles to each other, said depositing conveyor being mounted for horizontal movement in the directions of said straight line portions and said positioning means and depositing means being arranged for relative vertical movement; infeeding means disposed to supply articles in sequence to said depositing conveyor, means operatively associated with said depositing conveyor to control said depositing conveyor for deposition of a series of rows of articles parallel to one of said straight line portions forming a first layer of deposited articles; means responsive to deposition of a predetermined number of such rows for increasing the vertical spacing between said depositing conveyor and said positioning means to accommodate additional rows of articles on said first layer, and means responsive to such increase and operatively associated with said depositing conveyor to control the same for deposition of a series of rows of articles parallel to the other of said straight line portions to form a second layer of deposited articles superposed on and supported by said first layer.

18. In an apparatus for stacking articles on an article support, the combination of an endless depositing conveyor including two straight line portions at right angles to each other, mounting means on which said conveyor is supported, above a position to be occupied by the article support, with said straight line portions disposed horizontally, said mounting means providing for horizontal movement of said depositing conveyor in the directions of said straight line portions and for vertical movement; infeeding means operative to supply articles in sequence to said depositing conveyor, means operatively associated with said depositing conveyor to control the same for deposition of a series of articles parallel to one of said straight line portions, said means including means for moving said depositing conveyor stepwise in the direction of said other straight line portion, such series of rows of articles forming a first layer; means operatively associated with said depositing conveyor and responsive to deposit of a predetermined number of such rows for elevating said depositing conveyor sufficiently to accommodate a second layer of articles superposed on such first layer; means for moving said depositing conveyor horizontally to return the same to a position in which said other straight line portion is disposed generally above an edge of such first layer of articles which extends at right angles to said rows of articles, and means operatively associated with said depositing conveyor to control the same for deposition of a second series of articles parallel to said other straight line portion to form such second layer of articles, said last mentioned means including means for moving said depositing conveyor stepwise in the direction of said one straight line portion.

19. In an apparatus for stacking articles on an article receiver, the combination of support means for supporting the article receiver; an endless depositing conveyor having two straight line portions extending at right angles to each other; mounting means supporting said depositing conveyor above support means with said straight line portions disposed horizontally, said mounting means providing for horizontal movement of said depositing conveyor in the directions of said straight line portions, said support means and depositing conveyor being arranged for relative vertical movement; infeeding article conveyor means operatively associated with said depositing conveyor to supply articles thereto in sequence, said infeeding article conveyor means extending toward one of said straight line portions and including a conveyor portion disposed beneath said depositing conveyor and across which said depositing conveyor is shifted during said horizontal movement, means operatively associated with said depositing conveyor to control the same for deposition of a series of rows of articles parallel to one of said straight line portions to form a first layer of deposited articles; means responsive to deposition of a predetermined number of such rows for increasing the vertical spacing between said support means and said depositing conveyor to accommodate a second, superposed layer of articles, and means responsive to such increase and operatively associated with said depositing conveyor to control the same for deposition of a series of rows of articles on top of and supported by said first layer, parallel to the other of said straight line portions.

20. The apparatus of claim 19 and wherein said infeeding article conveyor means includes an input conveyor section pivotally mounted at one end and connected at the other end to the mounting means for said depositing conveyor, said input conveyor section of said infeeding article conveyor pivoting, by reason of its connection to said mounting means, to follow vertical movement of said depositing conveyor.

21. The apparatus of claim 20 and wherein said conveyor portion disposed beneath said depositing conveyor is suspended from the mounting means for said depositing conveyor.

22. In an apparatus for stacking articles on an article receiver, the combination of support means for supporting the article receiver; infeeding conveyor means operable to feed articles in sequence, said infeeding conveyor means extending beside said support means at a location above the level of said support means; an endless depositing conveyor including two straight line portions extending at right angles to each other; mounting means mounting said depositing conveyor above said support means with said straight line portions disposed horizontally and with one of said straight line portions extending transversely across said infeeding conveyor means, said mounting means providing for horizontal movement of said depositing conveyor as a unit in the directions of said straight line portions and said support means and said depositing conveyor being arranged for relative vertical movement, means operatively associated with said depositing conveyor to control the same for deposition of a series of rows of articles parallel to one of said straight line portions to form a first layer of deposited articles; means responsive to deposition of a predetermined number of such rows for increasing the vertical spacing between said support means and said depositing conveyor to accommodate a second layer of deposited articles, to be superposed on and supported by the first layer, and means responsive to such increase and operatively associated with said depositing conveyor to control the same for deposition of a series of rows of articles parallel to the other of said straight line portions to form such second layer, said depositing conveyor being constructed to receive articles as they are successively delivered by said infeeding conveyor means.

23. The apparatus of claim 22 including control means operatively associated with said infeeding conveyor means to prevent the supply of articles to said depositing conveyor by said infeeding conveyor means during movement of said depositing conveyor as a unit relative to said infeeding conveyor means.

24. In an apparatus for stacking articles on an article receiver, the combination of an endless depositing conveyor having two straight line portions extending at right angles to each other, mounting means mounting said depositing conveyor above a position to be occupied by the article support with said straight line portions disposed horizontally, said mounting means providing for bodily movement of said depositing conveyor vertically to any of a plurality of vertically spaced positions and horizontally in the directions of said straight line portions, infeeding conveyor means operatively associated with said depositing conveyor to feed articles thereto successively in any of said vertically spaced positions of said depositing conveyor, means operatively associated with said depositing conveyor to control the same for deposition of a series of rows of articles parallel to one of said straight line portions to form a first layer of deposited articles, means responsive to deposition of a predetermined number of such rows for elevating said depositing conveyor, and means responsive to such elevating of said depositing conveyor and operatively associated with said depositing conveyor to control the same for deposition of a series of rows of articles parallel to the other of said straight line portions to form a second layer of deposited articles superposed on and supported by the first layer.

References Cited in the file of this patent
UNITED STATES PATENTS
1,411,172    Kaye _____ Mar. 28, 1922